United States Patent
Enck et al.

(10) Patent No.: US 11,292,861 B2
(45) Date of Patent: Apr. 5, 2022

(54) AQUEOUS POLYMER DISPERSION

(71) Applicant: BASF SE, Ludwigshafen am Rhein (DE)

(72) Inventors: Sebastian Enck, Jakarta (ID); Peter Nesvadba, Basel (CH); Christoph Tonhauser, Ludwigshafen am Rhein (DE); Tobias Reinhard Umbach, Ludwigshafen am Rhein (DE); Meik Ranft, Ludwigshafen am Rhein (DE); Helmut Steininger, Ludwigshafen am Rhein (DE); Jens Hartig, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 547 days.

(21) Appl. No.: 16/321,493

(22) PCT Filed: Jul. 28, 2017

(86) PCT No.: PCT/EP2017/069109
§ 371 (c)(1),
(2) Date: Jan. 29, 2019

(87) PCT Pub. No.: WO2018/019977
PCT Pub. Date: Feb. 1, 2018

(65) Prior Publication Data
US 2021/0292457 A1      Sep. 23, 2021

(30) Foreign Application Priority Data

Jul. 29, 2016 (EP) .................................. 16181938

(51) Int. Cl.
| | | |
|---|---|---|
| *C08F 222/38* | (2006.01) |
| *C08F 222/10* | (2006.01) |
| *C08F 216/12* | (2006.01) |
| *C08J 3/12* | (2006.01) |
| *C09D 133/14* | (2006.01) |
| *C09J 133/14* | (2006.01) |
| *C09J 133/24* | (2006.01) |

(52) U.S. Cl.
CPC ...... *C08F 222/385* (2013.01); *C08F 216/125* (2013.01); *C08F 222/102* (2020.02); *C08J 3/122* (2013.01); *C09D 133/14* (2013.01); *C09J 133/14* (2013.01); *C09J 133/24* (2013.01); *C08F 2438/03* (2013.01); *C08J 2333/14* (2013.01); *C08J 2333/24* (2013.01)

(58) Field of Classification Search
CPC ............. C08F 222/385; C08F 222/102; C08F 216/125; C08F 2438/03; C09D 133/14; C09J 133/24; C09J 133/14; C09J 3/122; C09J 2333/14; C09J 2333/24
USPC ...................................................... 524/547
See application file for complete search history.

(56) References Cited

U.S. PATENT DOCUMENTS

| | | | | |
|---|---|---|---|---|
| 5,194,539 A | * | 3/1993 | Charmot .................. | C08F 2/38 524/812 |
| 5,756,574 A | | 5/1998 | Baumstark et al. | |
| 9,382,442 B2 | * | 7/2016 | Hartig ................. | C09D 133/12 |
| 2010/0204382 A1 | | 8/2010 | Evstatieva et al. | |
| 2012/0214930 A1 | | 8/2012 | Broecher et al. | |
| 2013/0096219 A1 | * | 4/2013 | Bowman ................... | C08F 2/38 522/33 |
| 2015/0099843 A1 | * | 4/2015 | Hartig ................... | C08F 265/06 524/460 |

FOREIGN PATENT DOCUMENTS

| | | |
|---|---|---|
| CN | 101821304 A | 9/2010 |
| CN | 102482361 A | 5/2012 |
| DE | 4419518 A1 | 12/1995 |
| DE | 4435422 A1 | 4/1996 |
| DE | 4435423 A1 | 4/1996 |
| EP | 1347027 A2 | 9/2003 |

(Continued)

OTHER PUBLICATIONS

Kamada et al. "Redox Responsive Behavior of Thiol/Disulfide-Functionalized Star Polymers Synthesized via Atom Transfer Radical Polymerization", Macromolecules, vol. 43, No. 9, May 11, 2010 (May 11, 2010), pp. 4133-4139. (Year: 2010).*
Gaulding et al. "Reversible Inter- and Intra-Microgel Cross-Linking Using Disulfides", Macromolecules, vol. 45, No. 1, Jan. 10, 2012 (Jan. 10, 2012), pp. 39-45. (Year: 2012).*
Gaulding, J., et al., "Reversible Inter- and Intra-Microgel Cross-Linking Using Disulfides", Macromolecules 2012, vol. 45, No. 1, (2012), pp. 39-45.
International Preliminary Examination Report for PCT/EP2017/069109 dated Aug. 23, 2018.
International Search Report for PCT/EP2017/069109 dated Sep. 21, 2017.

(Continued)

*Primary Examiner* — Michael M. Bernshteyn
(74) *Attorney, Agent, or Firm* — Faegre Drinker Biddle & Reath LLP

(57) ABSTRACT

The invention relates to aqueous polymer dispersions, comprising a water insoluble polymer P in the form of dispersed polymer particles, which is obtainable by free radical aqueous emulsion polymerization of ethylenically unsaturated monomers M, which comprise a) at least one monomer M1 which exhibits two ethylenically unsaturated moieties which are connected by a linker which comprises a disulfide moiety, and b) at least one monoethylenically unsaturated monomer M2, which has a low water solubility. The invention also relates to processes for preparing such an aqueous polymer dispersion, to solid polymer compositions in powder form, obtainable by drying such polymer dispersions, to the use of such polymer dispersions in a coating material, adhesive or sealant and to a methods of coating a surface of a substrate which comprises applying an aqueous coating composition, which contains such an polymer dispersion.

23 Claims, 2 Drawing Sheets

(56) References Cited

FOREIGN PATENT DOCUMENTS

WO    WO-2013174894 A1    11/2013

OTHER PUBLICATIONS

Kamada, J., et al., "Redox Responsive Behavior of Thiol/Disulfide-Functionalized Star Polymers Synthesized via Atom Transfer Radical Polymerization", Macromolecules 2010, vol. 43, No. 9, (2010), pp. 4133-4139.
Rosselgong, J., et al., "Quantification of Intramolecular Cyclization in Branched Copolymers by H NMR Spectroscopy", Macromolecules 2012, vol. 45, No. 6, (2012), pp. 2731-2737.
Written Opinion of the International Searching Authority for PCT/EP2017/069109 dated Sep. 21, 2017.
Yoon, J.A., et al., "Self-Healing Polymer Films Based on Thiol-Disulfide Exchange Reactions and Self-Healing Kinetics Measured Using Atomic Force Microscopy", Macromolecules 2012, vol. 45, No. 1, (2012), pp. 142-149.

* cited by examiner

Figure 1: Comparison of RAMAN spectra of Examples 1, 3, 6, and 10.
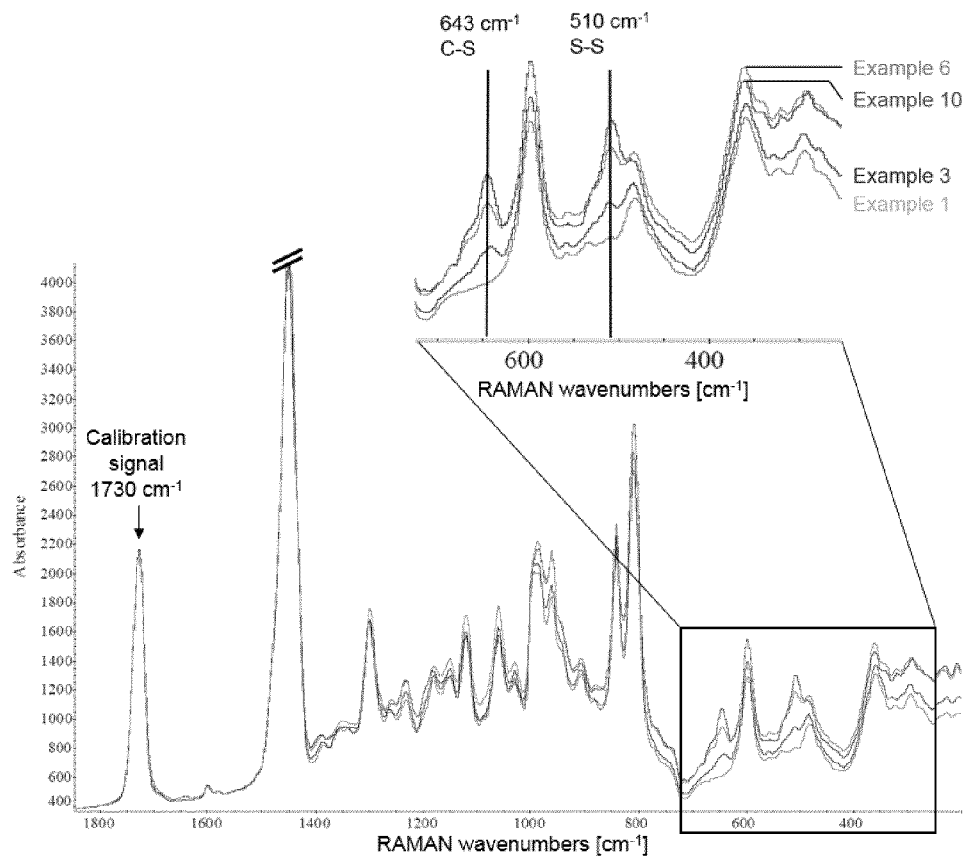
Figure 2: Comparison of stress-strain analysis results of Examples 1 to 4.
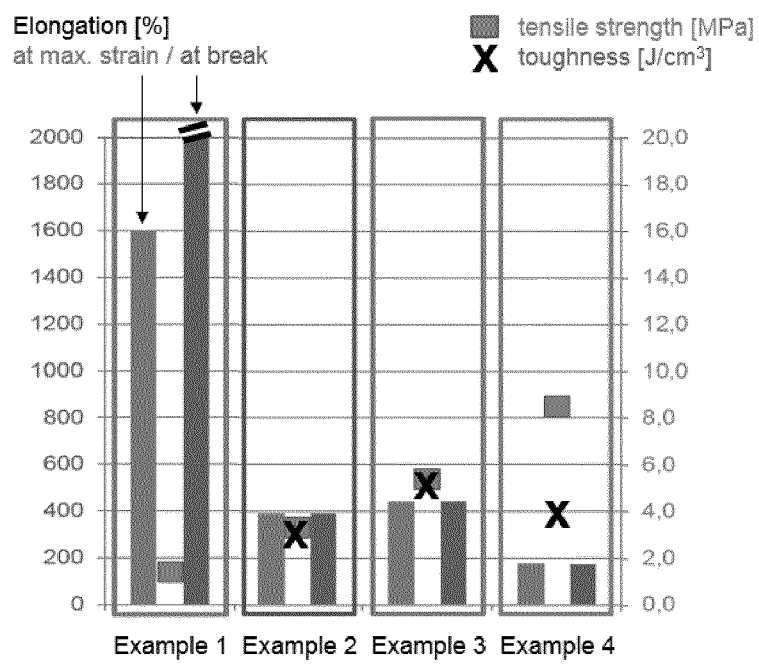

Figure 3: DMTA curves (storage modulus) of films containing 0.51 mmol/g polymer crosslinker.
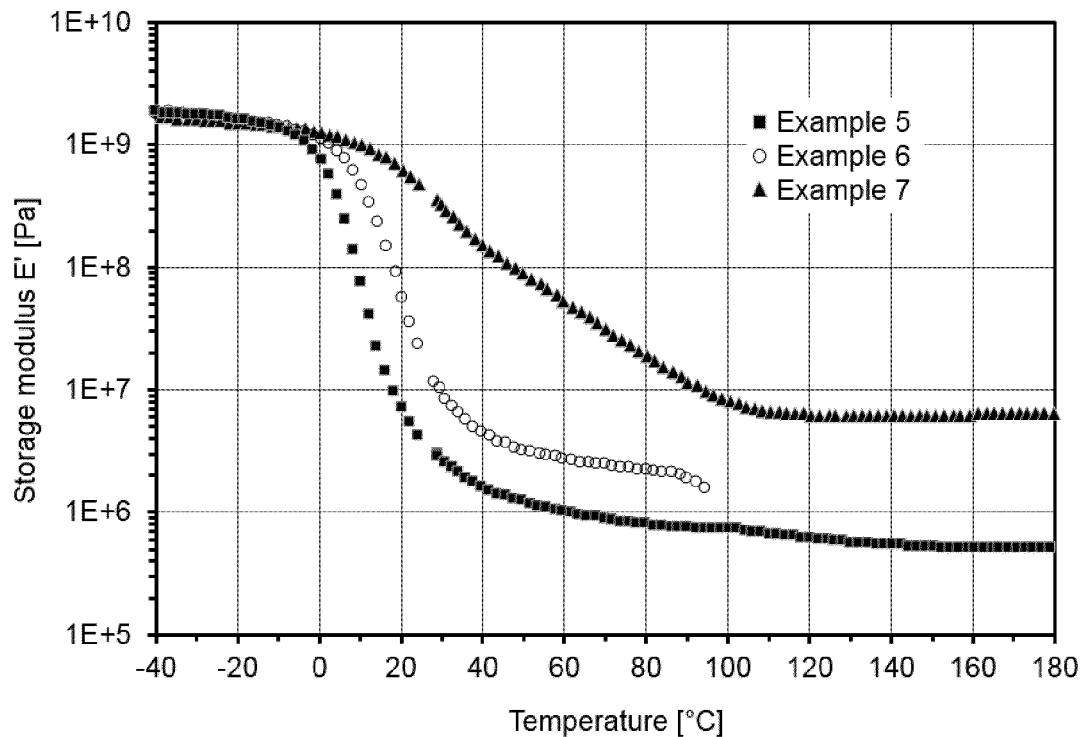
Figure 4: DMTA curves (storage modulus) of films containing various amounts of DSMDA crosslinker (0.17, 0.34 and 0.51 mmol/g polymer).
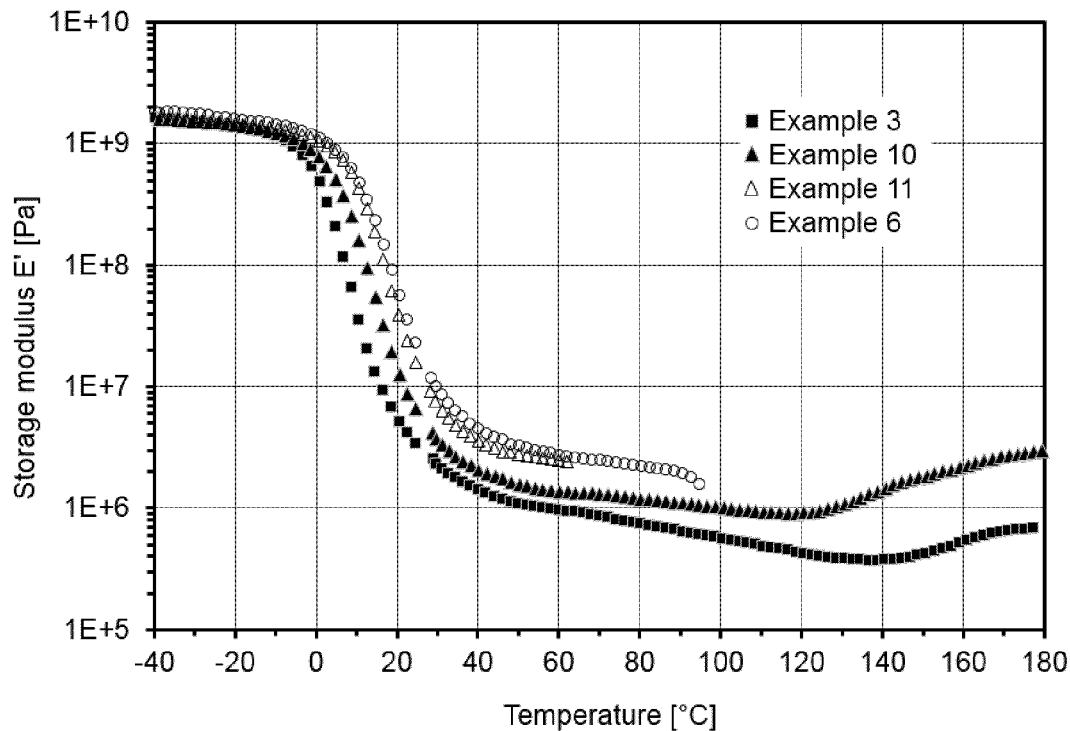

AQUEOUS POLYMER DISPERSION

CROSS-REFERENCE TO RELATED APPLICATIONS

This application is a national stage application (under 35 U.S.C. § 371) of PCT/EP2017/069109, filed Jul. 28, 2017, which claims benefit of European Application No. 16181938.8 filed Jul. 29, 2016, both of which are incorporated herein by reference in their entirety.

The present invention relates to aqueous polymer dispersions based on monoethylenically unsaturated polymer dispersions and a process for preparing them. The invention also relates to the use of these aqueous polymer dispersions.

BACKGROUND OF THE INVENTION

Aqueous dispersions of polymers prepared by chain growth polymerization (for example radical polymerization) or step growth polymerization (for example polycondensation or polyaddition) have found a broad use for the manufacturing of coatings or adhesives. These polymer dispersions function as a binder as they form a polymer film upon drying. However, polymer films obtained from these dispersions may have poor properties such as durability, water and solvent resistance and low mechanical strength.

Crosslinking of the film during or preferably after its formation has frequently been suggested for overcoming the disadvantages of non-crosslinked polymers. Several crosslinking methods have been suggested in the art.

A first method includes the use of monomers, which result in crosslinking during polymerization. A common class of crosslinking monomers are compounds having two or more ethylenically unsaturated moieties, such as di(meth)acrylates, which crosslink the polymer during the polymerization process. Commercially available compounds of this class are for example ethylene glycol dimethacrylate (EDGMA), 1,4-butanediol diacrylate (BDDA) and 1,6-hexanediol diacrylate (HDDA). Using such crosslinking monomers in emulsion polymerization provides dispersions of internally crosslinked polymer particles. These particles are crosslinked before film formation. Internal crosslinking may hamper coalescence of the polymer particles during film formation and thereby decrease the homogeneity of the polymer film and consequently its stability against mechanical stress or against chemicals.

In order to avoid the drawbacks associated with internal crosslinking, crosslinking systems have been suggested which affect crosslinking of the polymers in the aqueous polymer dispersion, during and after film formation ("post crosslinking"/"curing"). Thereby, the disadvantages associated with internal crosslinking are ameliorated and coalescence of the polymer particles during film-formation is less hampered. Crosslinking compounds of industrial relevance, which are suitable for providing post crosslinking, are for example compounds having at least two functional groups selected from oxazoline, aminoxy and hydrazide groups, or compounds bearing acetoacetyl groups. These crosslinkers, however, require polymers having a complementary functional group in the polymer, which is capable of forming a covalent bond with the crossliner. A standard self-crosslinking system is the combination of polymers bearing keto groups, e.g. polymers containing diacetone acrylamide (DAAM), with adipic acid dihydrazide (ADDH). These components react basically during and after film formation, although a certain extent of preliminary reaction can occur. However, the known post crosslinking systems have several drawbacks as the addition of the crosslinker may affect the stability of the polymer dispersion. Moreover such crosslinkers suffer from a high price of the raw materials and labeling issues since ADDH is toxic to the aqueous environment and was considered allergenic in the past. Furthermore, the known post crosslinking systems provide, if at all, only a low crosslinking density in the freshly formed film. Therefore, in the initial stage water resistance and chemical resistance can be poor and mechanical properties can be unsatisfactory.

Further crosslinking systems, which have been described in the art, are systems which provide reversible crosslinking. The performance of the DAAM/ADDH system can be attributed to a certain reversibility of hydrazone formation. Other reversible crosslinking systems are based on metal- or semi-metal compounds, e.g. metal salts of polyvalent metals such as zinc, or semi-metal compounds such as alkyl silicates, boric acid and the like. These metal or semi-metal compounds may react with functional groups on the surface of the polymer particles, such as hydroxyl, carboxylate or carboxamide groups, thereby resulting in a crosslinking of the polymer particles. However, crosslinking mainly occurs only on the surface of the polymer particles. Moreover, these polymers are sensitive to pH.

Recently, crosslinking systems have been suggested, which are mainly based on thiol/disulfide chemistry and which can be controlled by choosing reductive or oxidative conditions. Examples for those reversible crosslinking systems are polyamides and polyacrylate microgels, thermosets, and star-shaped polymers that bear disulfides moieties. In these systems, the addition of a reducing agent converts the disulfide moieties into thiol moieties, thereby cleaving the polymer network, whereas addition of an oxidant in the second step reestablishes the crosslinking by converting the thiol moieties into disulfide moieties. Furthermore, reagents such as phosphines and thiolates have been described which should enable a rearrangement of the network by thiol/disulfide exchange of disulfide metathesis, which enables to add self-healing properties.

Kamada et al. (Macromolecules 2010, 43, 4133-4139) describe a concept for the control of polymer morphology of star copolymers based on butyl acrylate (BA), wherein the shell of the star polymer is functionalized with bis(2-methacryloyloxyethyl disulfide) (disulfide diethanol diacrylate DSDMA). The redox behavior was investigated. Star copolymers, such as copolymers of BA and ethyleneglycol diacrylate prepared by controlled radical copolymerization ATRP are functionalized with DSDMA monomers and the disulfide functions are reduced using tri-n-butyl phophine and subsequently reoxidized with $FeCl_3/O_2$ yielding gels with inter-molecular linkages.

Gaulding et al. (Macromolecules 2012, 45, 39-45) describe aqueous microgels composed of N-isopropyl methacrylamide and N,N-Bis(acrylolyl)cystamine (BAC) via radical precipitation polymerization in water with thermal or redox initiation. The low-temperature redox initiation is assumed to be more compatible with disulfide incorporation since less "parasitic" radical side reactions (e.g. thioether formation) occur at lower temperature. The paper mentions bioconjugation and gel assembly as potential application fields.

Yoon et al. (Macromolecules 2012, 45, 142-149) describe self-healing polymer films based on thiol-disulfide exchange. Therein, star shaped polymers based on butyl acrylate and ethyleneglycol diacrylate are functionalized with bis(2-methacryloylethyl disulfide) (DSDMA) for crosslinking. These polymers are reduced to obtain solutions of polymers bearing thiol groups, which are casted on a silicon wafers and the crosslinked by oxidation.

Rosselgong and Armes (Macromolecules 2012, 45, 2731-2737) describe copolymers of methyl methacrylate (MMA) and DSDMA which are prepared via controlled radical polymerization in solution using the RAFT technology. Furthermore, the reduction of the disulfide to thiol is described to introduce thiol groups.

So far, the thiol/disulfide systems have not yet been transferred to industrially relevant aqueous polymer dispersions. In particular, these systems haven't been suggested for industrial applications of polymer dispersions such as adhesives, sealant or coating applications of for the use of producing polymer consolidated non-woven fabrics.

In fact, severe side reactions must be expected when trying to incorporate the thiol disulfide systems into aqueous polymer dispersions, because the thiols usually act as chain transfer agents during radical polymerization. Thus, monomers bearing thiol groups cannot be directly polymerized in a radical polymerization reaction. Therefore, one assumes that thiol monomers must be masked or protected during the polymerization, which would require a post treatment for achieve the properties associated with thiol/disulfide systems.

SUMMARY OF THE INVENTION

It is an object of the present invention to provide aqueous polymer dispersions based on ethylenically unsaturated monomers that overcome the drawbacks of polymer dispersions obtainable by using presently available crosslinking systems. The polymer dispersions should have advantageous material properties, such as improved stability and film forming properties, and should also provide advantageous material properties to coating materials.

It was surprisingly found that these and further objectives are achieved by aqueous polymer dispersions which are obtainable by free radical emulsion polymerisatioin of ethylenically unsaturated monomers M comprising at least one monomer M1 which has two ethylenically unsaturated moieties that are covalently connected by a linker which comprises a disulfide moiety.

Therefore, a first aspect of the invention relates to aqueous polymer dispersions, comprising a water insoluble polymer P in the form of dispersed polymer particles, which is obtainable by free radical aqueous emulsion polymerization of ethylenically unsaturated monomers M, which comprise
a) at least one monomer M1 which has two ethylenically unsaturated moieties which are connected by a linker which comprises a disulfide moiety, and
b) at least one monoethylenically unsaturated monomer M2, which has a low water solubility.

A second aspect of the invention relates to processes for preparing an aqueous polymer dispersion as defined herein, comprising a free radical emulsion polymerization of ethylenically unsaturated monomers M as defined herein.

A further aspect of the invention relates to solid polymer composition in powder form, obtainable by drying the polymer dispersion of the present invention.

A further aspect of the invention relates to the use of the polymer dispersions as defined herein or of a dispersion which is obtainable by a process as defined herein in a coating material, adhesive or sealant.

Yet a further aspect of the invention relates to the use of the polymer dispersions as defined herein or of a dispersion which is obtainable by a process as defined herein for producing a polymer-consolidated nonwoven fabric.

Yet a further aspect of the invention relates to the use of the polymer dispersions as defined herein or of a dispersion which is obtainable by a process as defined herein for modifying an inorganic, hydraulically setting binder.

Yet a further aspect of the invention relates to a method of coating a surface of a substrate which comprises applying an aqueous coating composition, which contains an aqueous polymer dispersion as defined herein as a binder, and allowing the thus obtained wet coating to dry in the presence of oxygen.

The invention is associated with several advantages:

The polymer dispersions of the invention combine pre- and post crosslinking mechanisms by introducing a reversible disulfide linkage/crosslinking mechanism. Thereby the advantages of an already initially crosslinked film with the generation of a homogeneous film by rearrangement of the crosslinking network during and after film formation are combined. As coalescence takes place, this rearrangement will crosslink the polymer chains of different particles, thereby improving homogeneity of the formed polymer film. Furthermore, such a crosslinking network can rearrange reversibly which enables the film to react on mechanical stress (e.g. cracks formed in the substrate). Thereby, improved mechanical properties of the polymer films are obtained.

Without being bound to theory, it is assumed that the disulfide monomer M1 first polymerizes as an internal crosslinker, thereby effecting crosslinking within the latex particles. Depending on the reaction conditions, a certain amount of thiols is generated during polymerization and during chemical deodorization, i.e. reaction of bisulfite with disulfides. During polymerization, these thiols will participate in radical reactions, e.g. as chain transfer agents. At least a part of the thiols generated during chemical deodorization, however, will be available for oxidative crosslinking, because two thiols are oxidized to re-form a disulfide, and, hence, for re-crosslinking. The re-crosslinking takes place by reaction of a thiol and a disulfide. This reaction already takes place within the dispersion particles.

As soon as coalescence (film formation) occurs, this reaction will also take place between functional groups belonging to different latex particles (coalescence). This effects a re-arrangement of the network from only intra- to also inter-particular crosslinking.

The re-crosslinking technology, as described herein, allows for maintaining a high crosslinking level straight from film formation, which is in contrast to many other crosslinking systems. Internal crosslinkers such as e.g. HDDA only establish an intra-particular crosslinking, which gives disadvantages for e.g. mechanical resistance.

Furthermore, the herein described re-crosslinking technology does not require a complete reduction of the disulfides in a separate step which is often required in the literature.

As shown herein, good chemical resistance of coatings is achieved by using polymer dispersions, wherein the polymer particles contain polymerized disulfides according to the invention. Furthermore, incorporation of disulfide monomers into an emulsion polymerization results in polymer dispersions, which improve the wood grain enhancement ('Anfeuerung'), resulting in a warmer wood tone than when DAAM/ADDH is present. This result was unexpected and it makes such polymer dispersions especially interesting as binders in clear coats for wood coating.

BRIEF DESCRIPTION OF THE DRAWINGS

FIG. 1 shows the RAMAN spectra of a sample without crosslinker in comparison to samples with varying amount of DSDMA.

FIG. 2 shows a graphical depiction of results for maximum strain, tensile strength and toughness.

FIG. 3 shows a comparison of measured storage modulus.

FIG. 4 shows a comparison of measured storage modulus.

DETAILED DESCRIPTION OF THE INVENTION

Herein, "water insoluble polymer" relates to a polymer having a solubility in deionized water at 25° C. and 1 bar of not more than 5 g/l. Preferably, the solubility of the water insoluble polymer in deionized water at 25° C. and 1 bar is not more than 2 g/l, more preferably not more than 1 g/l, and in particular not more than 0.1 g.

Herein, "monomers having a low water solubility" relates to monomers having a solubility in deionized water at 25° C. and 1 bar of not more than 60 g/l and more particularly 30 g/l, and is situated typically in the range from 0.1 to 30 g/l at 25° C. and 1 bar.

Herein, the term "(meth)acrylate" comprises both the corresponding compounds of acrylic acid but also the corresponding compounds of methacrylic acid. Similarly, the term "(meth)acrylamide" here comprises both the corresponding amide of acrylic acid and the corresponding amide of methacrylic acid. Similar applies for similar terms.

The term "linker" in the context of monomers M1 relates to a moiety in the monomer M1, which covalently links the two ethylenically unsaturated moieties of M1 to a single monomer molecule.

Herein, the terms "group" and "moiety" are used synonymously.

A first aspect of the invention relates to aqueous polymer dispersions comprising a water insoluble polymer P in the form of dispersed polymer particles, which is obtainable by free radical aqueous emulsion polymerization of ethylenically unsaturated monomers M, which comprise
a) at least one monomer M1 which has two ethylenically unsaturated moieties which are connected by a linker which comprises a disulfide moiety, and
b) at least one monoethylenically unsaturated monomer M2, which has a low water solubility.

According to the invention, the monomers M1 have two ethylenically unsaturated moieties, which are connected by a linker, which comprises a disulfide moiety. These monomers can principally be described by the following general structure

wherein $Q^a$ and $Q^b$ are, independently from each other, organic moieties bearing an ethylenically unsaturated moiety. The organic moieties $Q^a$ and $Q^b$ are usually unsaturated O3-O20 group, which optionally bear one, two, three or more, e.g. 2, 3, 4, 5 or 6, heteroatoms such as oxygen and/or nitrogen. Examples of $Q^a$ and $Q^b$ include moieties $H_2C=C-Q^*-$ wherein $Q^*$ is a chemical bond or a saturated group with 1 to 10 C atoms, that is optionally interrupted by 1 or 2 heteroatoms selected from oxygen and nitrogen, and/or that is optionally interrupted by 1 or 2 carbonyl moieties.

As used herein, the prefix $C_n$-$C_m$ in the context of a generic definition of a moiety or group indicates the possible number of carbon atoms the individual group or moiety within the generically defined group or moiety may have. For example, the prefix $C_1$-$C_4$ indicates that the individual moieties within the generically defined moiety may have 1, 2, 3 or 4 carbon atoms.

As used herein, the term $C_1$-$C_{30}$ alkyl generically defines the group of individual alkyl groups, i.e. linear or branched alkyl groups which may have 1 to m carbon atoms. E.g. $C_1$-$C_3$ alkyl and $C_1$-$C_8$ alkyl generically defines the groups of individual alkyl groups which have 1 to 3 carbon atoms or 1 to 8 carbon atoms, examples including methyl, ethyl, n-propyl, isopropyl, n-butyl, 2-butyl, isobutyl, tert.-butyl, n-pentyl, n-hexyl, n-heptyl, n-octyl and 2-ethylhexyl.

The term $C_1$-$C_{30}$ alkylene generically defines the group of individual bivalent, saturated hydrocarbon groups, i.e. linear or branched alkylene groups which may have 1 to m carbon atoms. Examples of $C_1$-$C_m$ alkylene include $CH_2$ (methylene), $CH_2CH_2$ (=1,2-ethandiyl or ethane-1,2-diyl, respectively), $CH(CH_3)$ (=1,1-ethandiyl or ethane-1,1-diyl, respectively), $CH_2CH_2CH_2$ (=1,3-propandiyl or propane-1,3-diyl, respectively), $(CH_2)_4$ (=1,4-butandiyl or butane-1,4-diyl, respectively), $(CH_2)_6$ (=1,6-hexandiyl or hexane-1,6-diyl, respectively), $CH(CH_3)CH(CH_3)$ (=1-methyl-1,2-propandiyl or 1-methyl-propane-1,2-diyl, respectively), $CH_2C(CH_3)_2CH_2$ (=2,2-dimethyl-1,3-propandiyl or 2,2-dimethyl-propane-1,3-diyl, respectively).

Preferred moieties $Q^a$ and $Q^b$ can be described by the following general structure

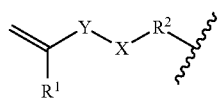

wherein X is O or NH, Y is $CH_2$, C=O or a chemical bond, $R^1$ is H or $C_1$-$C_3$-alkyl, and $R^2$ is $C_1$-$C_8$-alkylene, in particular $C_1$-$C_4$-alkylene.

The groups $Q^a$ and $Q^b$ can be identical or different. Preferably, $Q^a$ and $Q^b$ are identical.

In a preferred embodiment, the monomer M1 is selected from monomers of formula (I)

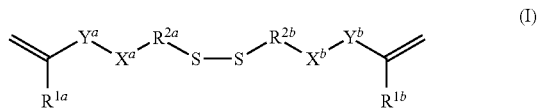

wherein $X^a$ is O or NH, $X^b$ is O or NH, $Y^a$ is $CH_2$, C=O or a chemical bond, $Y^b$ is $CH_2$, C=O or a chemical bond, $R^{1a}$ is H or $C_1$-$C_3$-alkyl, $R^{1b}$ is H or $C_1$-$C_3$-alkyl, $R^{2a}$ is $C_1$-$C_8$-alkylene, in particular $C_1$-$C_4$-alkylene, especially ethan-1,2-diyl, $R^{2b}$ is $C_1$-$C_8$-alkylene, in particular $C_1$-$C_4$-alkylene, especially ethan-1,2-diyl.

In formula (I), the groups $X^a$ and $X^b$ can be identical or different. Preferably, $X^a$ and $X^b$ are identical. In particular, $X^a$ and $X^b$ are both O.

In formula (I), the groups $Y^a$ and $Y^b$ can be identical or different. Preferably, $Y^a$ and $Y^b$ are identical. In particular, $Y^a$ and $Y^b$ are both C=O.

In a more preferred embodiment, the monomer M1 is selected from monomers of formula (Ia)

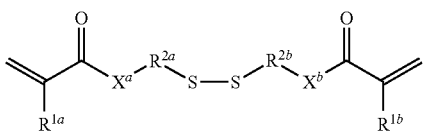

(Ia)

wherein
$X^a$ is O or NH, preferably O,
$X^b$ is O or NH, preferably O,
$R^{1a}$ is H or $C_1$-$C_3$-alkyl, preferably H or $CH_3$,
$R^{1b}$ is H or $C_1$-$C_3$-alkyl, preferably H or $CH_3$,
$R^{2a}$ is $C_1$-$C_4$-alkylene, preferably ethane-1,2-diyl,
$R^{2b}$ is $C_1$-$C_4$-alkylene, preferably ethane-1,2-diyl.

In formula (Ia), the groups $X^a$ and $X^b$ are preferably identical.

In formulae (I) and (Ia), the groups $R^{1a}$ and $R^{1b}$ can be identical or different. Preferably, $R^{1a}$ and $R^{1b}$ are identical. Preferably, $R^{1a}$ and $R^{1b}$ are selected from H and $C_1$-$C_3$-alkyl, and more preferably from H and CHs.

In formulae (I) and (Ia), the groups $R^{2a}$ and $R^{2b}$ can be identical or different. Preferably, $R^{2a}$ and $R^{2b}$ are identical. Preferably, $R^{2a}$ and $R^{2b}$ are selected from the group consisting of $C_1$-$C_4$-alkylene, and more preferably from ethane-1, 2-diyl.

In a specifically preferred embodiment, the monomer M1 is selected from the group consisting of compounds of formulae (Ia1), (Ia2), and (Ia3).

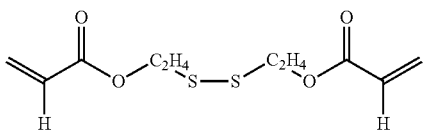

(Ia1)

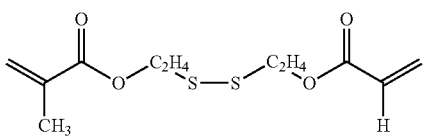

(Ia2)

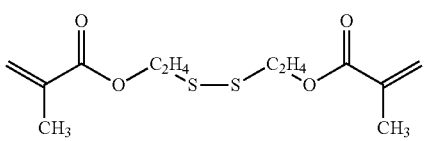

(Ia3)

According to the invention, the monomers M2 are monoethylenically unsaturated monomers that have a low water solubility The monomers having a low water solubility are generally those monomers whose solubility in deionized water at 25° C. and 1 bar does not exceed 60 g/l and more particularly 30 g/l, and is situated typically in the range from 0.1 to 30 g/l at 25° C. and 1 bar.

The monoethylenically unsaturated monomers M2 have precisely one ethylenically unsaturated C=C double bond.

Suitable monomers M2 are for example
esters of monoethylenically unsaturated monocarboxylic acids with alkanols and diesters of dicarboxylic acids with alkanols, in particular esters and diesters of monoethylenically unsaturated $C_3$-$C_8$ monocarboxylic and $C_4$-$C_8$ dicarboxylic acids with $C_1$-$C_{30}$ alkanols, esters of vinyl alcohol or allyl alcohol with monocarboxylic acids, in particular esters of vinyl alcohol or allyl alcohol with $C_1$-$C_{30}$ monocarboxylic acids, substituted and unsubstituted vinylaromatics, in particular vinylaromatic hydrocarbons, amides of monoethylenically unsaturated monocarboxylic acids with alkylamines or dialkylamines and diamides of dicarboxylic acids with alkylamines or dialkylamines, in particular amides and diamides of monoethylenically unsaturated $C_3$-$C_8$ monocarboxylic and $C_4$-$C_8$ dicarboxylic acids with $C_1$-$C_{30}$ alkylamines or di-$C_1$-$C_{30}$ alkylamines, vinyl halides and vinylidene halides, in particular vinyl chloride, vinylidene chloride, vinyl fluoride, and vinylidene fluoride, and mixtures thereof.

The term "monoethylenically unsaturated $C_3$-$C_8$ monocarboxylic acid" stands for a monovalent carboxylic acid having 3 to 8 C atoms that has an ethylenically unsaturated C=C double bond, such as for acrylic acid, methacrylic acid, vinylacetic acid or crotonic acid, for example.

The term "monoethylenically unsaturated $C_4$-$C_8$ dicarboxylic acid" stands for a divalent carboxylic acid having 4 to 8 C atoms that has an ethylenically unsaturated C=C double bond, such as for maleic acid, fumaric acid, itaconic acid or citraconic acid, for example.

Suitable esters and diesters of monoethylenically unsaturated $C_3$-$C_8$ monocarboxylic and $C_4$-$C_8$ dicarboxylic acids with $C_1$-$C_{30}$ alkanols, especially with $C_1$-$C_{10}$ alkanols, are, in particular, the esters of monoethylenically unsaturated $C_3$-$C_8$ monocarboxylic acids, especially the esters of acrylic acid and the esters of methacrylic acid, with $C_1$-$C_{30}$ alkanols, in particular with $C_1$-$C_{10}$ alkanols, such as methyl (meth)acrylate, methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachidyl (meth)acrylate, behenyl (meth)acrylate, lignoceryl (meth)acrylate, cerotyl (meth)acrylate, melissyl (meth)acrylate, palmitoleyl (meth)acrylate, oleyl (meth)acrylate, linolyl (meth)acrylate, linolenyl (meth)acrylate, stearyl (meth)acrylate and lauryl (meth)acrylate, but also the diesters of monoethylenically unsaturated $C_4$-$C_8$ dicarboxylic acids, in particular the diesters of maleic acid with $C_1$-$C_{30}$ alkanols, such as dimethyl maleate, diethyl maleate, di(n-propyl) maleate, diisopropyl maleate, di(n-butyl) maleate, di(n-hexyl) maleate, di(1,1,3,3-tetramethylbutyl) maleate, di(n-nonyl) maleate, ditridecyl maleate, dimyristyl maleate, dipentadecyl maleate, dipalmityl maleate, diarachidyl maleate and mixtures thereof.

The term "(meth)acrylate" here comprises both the corresponding ester of acrylic acid and the corresponding ester of methacrylic acid.

Suitable esters of vinyl alcohol and allyl alcohol with $C_1$-$C_{30}$ monocarboxylic acids, especially with $C_1$-$C_{12}$ monocarboxylic acids, are, for example, vinyl formate, vinyl acetate, vinyl propionate, vinyl butyrate, vinyl laurate, vinyl stearate, vinyl esters of versatic acid, allyl formate, allyl acetate, allyl propionate, allyl butyrate, allyl laurate, and mixtures thereof.

Suitable vinylaromatics are unsubstituted and substituted vinylaromatic compounds consisting of a vinyl moiety and a $C_6$-$C_{20}$ aromatic moiety. The aromatic moiety can be substituted with at least one $C_1$-$C_{12}$ hydrocarbon. Suitable vinylaromatics are in particular styrene and $C_1$-$C_{12}$ alkyl substituted styrene such as 2-methylstyrene, 4-methylstyrene, 2-n-butylstyrene, 4-n-butylstyrene, 4-n-decylstyrene, especially styrene.

Suitable amides and diamides of monoethylenically unsaturated $C_3$-$C_8$ monocarboxylic and $C_4$-$C_8$ dicarboxylic acids with $C_1$-$C_{30}$ alkylamines or di-$C_1$-$C_{30}$ alkylamines, in particular with $C_1$-$C_{10}$ alkylamines or di-$C_1$-$C_{10}$ alkylamines, are, in particular, the amides of acrylic acid and of methacrylic acid with $C_1$-$C_{30}$ alkylamines or di-$C_1$-$C_{30}$ alkylamines, in particular with $C_1$-$C_{10}$ alkylamines or di-$C_1$-$C_{10}$ alkylamines, such as, for example, N-methyl(meth)acrylamide, N-ethyl(meth)acrylamide, N-propyl(meth)acrylamide, N-(n-butyl)(meth)acrylamide, N-(tert-butyl)(meth)acrylamide, N-(n-octyl)-(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)-acrylamide, N-pentadecyl(meth)acrylamide, N-palmityl(meth)acrylamide, N-heptadecyl(meth)acrylamide, N-nonadecyl(meth)acrylamide, N-arachidyl(meth)-acrylamide, N-behenyl(meth)acrylamide, N-lignoceryl(meth)acrylamide, N-cerotyl-(meth)acrylamide, N-melissyl(meth)acrylamide, N-palmitoleyl(meth)acrylamide, N-oleyl(meth)acrylamide, N-linolyl(meth)acrylamide, N-linolenyl(meth)acrylamide, N-stearyl(meth)acrylamide, N-lauryl(meth)acrylamide, N,N-dimethyl(meth)acrylamide, N,N-diethyl(meth)acrylamide, but also the diamides and imides of maleic acid with $C_1$-$C_{30}$ alkylamines or di-$C_1$-$C_{30}$ alkylamines, in particular with $C_1$-$C_{10}$ alkylamines or di-$C_1$-$C_{10}$ alkylamines, such as, for example, N,N'-dimethylmaleamide, N,N'-diethyl-maleamide, N,N'-dipropylmaleamide, N,N'-di-(tert-butyl)maleamide, N,N'-di-(n-octyl)-maleamide, N,N'-di-(n-nonyl)maleamide, N,N'-ditridecylmaleamide, N,N'-dimyristyl-maleamide, N,N,N',N'-tetramethylmaleamide, N,N,N',N'-tetraethylmaleamide, and mixtures thereof. The term "(meth)acrylamide" here comprises both the corresponding amide of acrylic acid and the corresponding amide of methacrylic acid.

Suitable vinyl halides and vinylidene halides are vinyl chloride, vinylidene chloride, vinyl fluoride, vinylidene fluoride, and mixtures thereof.

In a preferred embodiment, the monomers M2 are selected from the group consisting of
esters of monoethylenically unsaturated $C_3$-$C_8$ monocarboxylic acids with $C_1$-$C_{30}$ alkanols and diesters of $C_4$-$C_8$ dicarboxylic acids with $C_1$-$C_{30}$ alkanols,
esters of vinyl alcohol or allyl alcohol with $C_1$-$C_{30}$ monocarboxylic acids,
vinylaromatics, in particular styrene and $C_1$-$C_{12}$ alkyl substituted styrenes, especially styrene,
amides of monoethylenically unsaturated $C_3$-$C_8$ monocarboxylic with $C_1$-$C_{30}$ alkylamines or di-$C_1$-$C_{30}$ alkylamines and diamides of $C_4$-$C_8$ dicarboxylic acids with $C_1$-$C_{30}$ alkylamines or di-$C_1$-$C_{30}$ alkylamines,
and mixtures thereof.

In a more preferred embodiment, the monomers M2 are selected from
esters and diesters of monoethylenically unsaturated $C_3$-$C_8$ monocarboxylic and $C_4$-$C_8$ dicarboxylic acids with $C_1$-$C_{10}$ alkanols,
esters of vinyl alcohol or allyl alcohol with $C_1$-$C_{12}$ monocarboxylic acids,
styrene and $C_1$-$C_{12}$ alkyl substituted styrene,
amides and diamides of monoethylenically unsaturated $C_3$-$C_8$ monocarboxylic and $C_4$-$C_8$ dicarboxylic acids with $C_1$-$C_{10}$ alkylamines or di-$C_1$-$C_{10}$-alkylamines,
and mixtures thereof.

In a more preferred embodiment, the at least one monomer M2 is selected from the group consisting of esters of monoethylenically unsaturated $C_3$-$C_8$ monocarboxylic acids, in particular the esters of acrylic acid (acrylates) and the esters of methacrylic acid (methacrylates), with $C_1$-$C_{10}$ alkanols, and styrene and $C_1$-$C_{12}$ alkyl substituted styrene and mixtures thereof.

In a more preferred embodiment, the at least one monomer M2 is selected from the group consisting of $C_1$-$C_{10}$ alkylacrylates and $C_1$-$C_{10}$ alkylmethacrylates and styrene and mixtures thereof.

In an even more preferred embodiment, the monomer M2 is selected the group consisting of from methyl acrylate, ethyl acrylate, n-propyl acrylate, isopropyl acrylate, n-butyl acrylate, tert-butyl acrylate, 2-butyl acrylate, isobutyl acrylate, 2-ethylhexyl acrylate, methyl methacrylate, n-butyl methacrylate, tert-butyl methacrylate, and styrene and mixtures thereof.

In a preferred embodiment of the invention, the monomers M comprise at least of 80% by weight, based on the total amount of monomers M, of the monomers M1 and M2.

More preferably, the monomers M comprise at least 90% by weight, and even more preferably at least 95% by weight, based on the total amount of monomers M, of the monomers M1 and M2.

In a preferred embodiment, the monomers M comprise 0.1 to 30% by weight, based on the total amount of monomers M, of monomers M1. More preferably, the monomers M comprise 0.5 to 20% by weight, and even more preferably 1 to 15% by weight, based on the total amount of monomers M, of the monomers M1.

In a preferred embodiment, the monomers M comprise 70 to 99.9% by weight, based on the total amount of monomers M, of monomers M2. More preferably, the monomers M comprise 80 to 99.5% by weight, and even more preferably 85 to 99% by weight, based on the total amount of monomers M, of the monomers M1.

In a preferred embodiment of the invention, the monomers M additionally comprise at least one monoethylenically unsaturated monomer M3 which is water soluble.

The water soluble monomer usually has a higher water solubility that the above mentioned monomers having a low water solubility. Generally, the water soluble monomers are generally those monomers whose solubility in deionized water at 25° C. and 1 bar is at least 60 g/l and more particularly at least 100 g/l.

In particular, the monomers M3, are selected from the group consisting of
monoethylenically unsaturated $C_3$-$C_8$ monocarboxylic acids and the primary amides of monoethylenically unsaturated $C_3$-$C_8$ monocarboxylic acids,
hydroxy-$C_2$-$C_4$ alkyl esters of monoethylenically unsaturated $C_3$-$C_8$ monocarboxylic acids,
monoesters of monoethylenically unsaturated $C_3$-$C_8$ carboxylic acids with polyoxy-$C_2$-$C_4$ alkylene ethers,
monoethylenically unsaturated monomers having at least one urea group,
and mixtures thereof.

Suitable monoethylenically unsaturated $C_3$-$C_8$ monocarboxylic acids and primary amides of monoethylenically unsaturated $C_3$-$C_8$ monocarboxylic acids are for example acrylic acid, methacrylic acid, acrylamide, methacrylamide, and the mixtures thereof.

Suitable hydroxy-$C_2$-$C_4$ alkyl esters of monoethylenically unsaturated $C_3$-$C_8$ monocarboxylic acids are for example the hydroxy-$C_2$-$C_4$ alkyl esters of acrylic acid and of methacrylic acid, such as 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, and mixtures thereof.

Suitable monoesters of monoethylenically unsaturated $C_3$-$C_8$ monocarboxylic with polyoxy-$C_2$-$C_4$ alkylene ethers are, for example, the monoesters of monoethylenically unsaturated $C_3$-$C_8$ monocarboxylic acids, more particularly of acrylic acid and of methacrylic acid, with poly-$C_2$-$C_4$ alkylene ethers of the general formula (A)

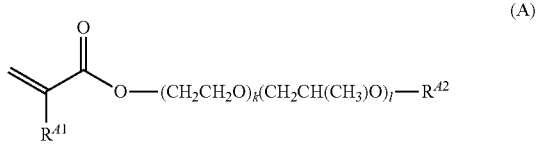

(A)

wherein
the sequence of the alkylene oxide units is arbitrary,
k and l independently of one another are each an integer in the range from 0 to 100, preferably in the range from 0 to 50, and more particularly in the range from 0 to 50, the sum of k and l being at least 3, more particularly 4, e.g., 3 to 200, and more particularly 4 to 100,
$R^{41}$ is hydrogen or $C_1$-$C_8$ alkyl, more particularly hydrogen or methyl.
$R^{42}$ is hydrogen, $C_1$-$C_{30}$ alkyl, $C_5$-$C_8$ cycloalkyl or $C_6$-$C_{14}$ aryl, and
Preferably k is an integer from 3 to 50, more particularly 4 to 30. Preferably l is an integer from 0 to 30, more particularly 0 to 20. More preferably l is 0. More preferably the sum of k and l is situated in the range from 3 to 50 and more particularly in the range from 4 to 40.
$R^{41}$ in the formula (A) is preferably hydrogen or methyl.
$R^{42}$ in the formula (A) is preferably hydrogen, $C_1$-$C_{20}$ alkyl, e.g., methyl, ethyl, n-propyl, isopropyl, n-butyl or sec-butyl, n-pentyl, n-hexyl, octyl, 2-ethylhexyl, decyl, lauryl, palmityl or stearyl. $R^a$ is more preferably hydrogen or $C_1$-$C_4$ alkyl.

Suitable monoethylenically unsaturated monomers having at least one urea group are, for example, N-vinylurea, N-(2-acryloyloxyethyl)imidazolidin-2-one and N-(2-methacryloyloxyethyl)imidazolidin-2-one (2-ureidomethacrylate, UMA).

In a preferred embodiment, the at least one monomer M3 is selected from acrylic acid, methacrylic acid, acrylamide, methacrylamide, 2-hydroxyethyl acrylate and 2-hydroxyethyl methacrylate.

In a preferred embodiment of the invention, the monomers M comprise or consist of
0.1 to 30% by weight, in particular 0.5 to 20% by weight, especially 1 to 15% by weight, based on the total amount of monomers M, of at least one monomer M1, and
70 to 99.9% by weight, in particular 80 to 99.5% by weight, and especially 85 to 99% by weight, based on the total amount of monomers M, of at least one monomer M2,
0 to 20% by weight, in particular 0 to 15% by weight, especially 0 to 10% by weight, based on the total amount of monomers M, of at least one monomer M3.

In a particular alternative, the monomers M do comprise monomers M3. In another particular alternative, the monomers M do not comprise monomers M3.

In a more preferred embodiment, the monomers M comprise or consist of
0.1 to 30% by weight, in particular 0.5 to 20% by weight, especially 1 to 15% by weight, based on the total amount of monomers M, of at least one monomer M1, and
70 to 99.8% by weight, in particular 70 to 98.5% by weight, and especially 85 to 98% by weight, based on the total amount of monomers M, of at least one monomer M2,
0.1 to 20% by weight, in particular 0.5 to 15% by weight and especially 1 to 10% by weight, based on the total amount of monomers M, of at least one monomer M3.

Besides the aforementioned monomers M1, M2, and M3, the monomers M, and consequently the polymers P obtained therefrom in copolymerized form, may also comprise small amounts of polyethylenically unsaturated monomers (monomers M4a) and/or small amounts of monoethylenically unsaturated monomers having at least on reactive group (monomers M4b), which lead to internal or external cross-linking of the polymer P. The fraction of such monomers M4 consisting of monomers M4a and M4b, however, will not exceed generally 4% by weight, more particularly 2% by weight, more particularly 1% by weight, and especially 0.1% by weight, based on the total amount of the monomers M that constitute the polymer.

Examples of polyethylenically unsaturated monomers M4a are e.g. diesters and triesters of ethylenically unsaturated carboxylic acids, more particularly the bisacrylates of diols and triols and the trisacrylates of triols and tetraols, e.g., the bisacrylates and the bismethacrylates of ethylene glycol, diethylene glycol, triethylene glycol, neopentyl glycol or polyethylene glycols, vinyl and allyl esters of saturated or unsaturated dicarboxylic acids, vinyl and allyl esters of monoethylenically unsaturated monocarboxylic acids, and also N,N-diallylamines with hydrogen or an alkyl group as further substituents on the nitrogen, especially N,N-diallylamine and N,N-diallyl-N-methylamine.

Examples of reactive groups of monoethylenically unsaturated monomers having at least on reactive group monomers M4b are the oxazoline group, the oxirane group, the keto group and the acetoacetyl group, which may either react with each other or with external crosslinkers.

Examples of monoethylenically unsaturated monomers having at least on reactive group, i.e. monomers M4b, are e.g. 2-(2-oxo-imidazolidin-1-yl)ethyl (meth)acrylate, N-[2-(2-oxooxazolidin-3-yl)ethyl](meth)acrylate, 2-acetoacetoxyethyl (meth)acrylate, acetoacetoxypropyl (meth)acrylate, acetoacetoxybutyl (meth)acrylate, diacetoneacrylamide (DAAM), diacetonemethacrylamide, glycidylacrylate, glycidylmethacrylate (GMA), These monomers M4b can, depending on their nature, act as a crosslinker either alone or in combination with another compound. Typical example for the latter are crosslinking system of polymers having a oxazoline group, a oxirane group, a keto group and/or a acetoacetyl group with a dihydrazide of a dicarboxylic acid, such as adipic acid dihydrazide, or with a compound having at least two primary amino groups or at least two aminoxy groups. A common system are polymers comprising diacetone acrylamide (ADDH) in copolymerized form together with adipic acid dihydrazide (ADDH).

In a preferred embodiment of the invention, the polymer P has thiol groups. These thiols groups derive from the monomers M1.

The thiol groups can be detected by commonly known analystical techniques, such as electron microscopy, Raman spectroscopy and/or Ellman's reagent.

The amount of thiol groups in the polymer P is usually in the range of 0.01 to 10% by weight, based on the weight of the polymer P. Preferably, the amount of thiol groups is the range of 0.05 to 8% by weight, more preferably in the range of 0.1 to 6% by weight, based on the weight of the polymer P.

According to the invention, the polymer P is obtained by free radical aqueous emulsion polymerization of monomers M.

Generally, the monomers M, which are essentially ethylenically unsaturated monomers, can be polymerized by common free radical aqueous emulsion polymerization methods that are well known in the art. Typical free radical aqueous emulsion polymerization techniques which can be used for preparing the polymers P are described e.g. in Ullmann's Encyclopedia of Industrial Chemistry; Polymerization Processes, 2. Modeling of Processes and Reactors; VCH.

In contrast to controlled radical polymerization methods, the polymers P are prepared by a free radical polymerization technique, which means that in the polymerization reaction free radicals are generated that initiate a chain-growth polymerization reaction of the monomers M. Other than in controlled radical polymerization the growing polymer chain in free radical polymerization bears a free radical which is not masked. Typically, a free radical polymerization technique of ethylenically unsaturated monomers requires a polymerization initiator or initiator system, which forms a free radical under polymerization conditions. However, other techniques of generating free radical may also be suitable, including ionizing radiation, sonication and electrolysis. Suitable means for initiating the radical polymerization therefore include thermal initiation, thermal decomposition, photolysis, redox reactions, ionizing radiation, electrochemical initiation, plasma, sonication, and ternary initiators. Suitable means for initiating free radical polymerization are described by Cowie and Arright in Polymers: chemistry and physics of modern materials; 3rd editions; CRC Press.

Preferably, the polymerization is initiated by thermal initiation or by a redox initiating system.

Thermal initiation means that a polymerization initiator is used, which decomposes by heating, thereby generating free radicals. For a typical thermal initiation, a compound, i.e. a polymerization initiator, is used, that produces one or two radicals upon heating. Typically, a polymerization initiator for thermal initiation comprises a diazo or peroxo moiety. Examples of those compounds include organic peroxides, azo compounds such as benzoyl peroxide, dicumyl peroxide, 2,2'-azobis(isovaleronitrile), azobis(cyclohexylnitril), azobis(amidinopropan), 2,2'-Azobis[2-methyl-N-(2-hydroxyethyl)propionamide], 2,2'-Azobis[2-(2-imidazolin-2-yl)propane]dihydrochloride, 2,2'-Azobis[N-(2-carboxyethyl)-2-methylpropionamidine] and 2,2'-azobis(isobutyronitril). Further suitable compounds include persulfate compounds, in particular the salts, especially the ammonium salts and alkali metal salts of peroxodisulfuric acid, such as sodium peroxodisulfate, potassium peroxodisulfate and ammonium peroxodisulfate.

Typical redox initiating systems or redox initiators, respectively, usually comprise an oxidizing agent and a reducing agent, which react by forming radicals or an oxidizing agent which decomposes by a disproportionation reaction. A typical example of the latter is the reaction of hydrogen peroxide or an alkyl hydrogen peroxide with a transition metal ion, such as $Fe^{2+}$ or other reductants such as $Cr^{2+}$, $V^{2+}$, $Ti^{3+}$, $Co^{2+}$, and $Cu^+$. Further typical redox initiator systems are those mentioned below as redox initiators.

In a preferred embodiment, the polymer P is obtained by a emulsion polymerization initiated with an initiating system/polymerization initiator selected from
- initiating systems/polymerization initiators comprising an oxidizing agent and a reducing agent and
- initiating systems/polymerization initiators comprising or consisting of a persulfate compound.

The initiating systems comprising an oxidazing agent and a reducing agent, often also called reduction-oxidation initiator systems or redox initiators, are usually composed of at least one, usually organic or inorganic reducing agent and at least one organic or inorganic oxidizing agent.

Preferred oxidizing components include, for example, peroxide compounds having at least one peroxide or hydroperoxide group. Examples are ammonium salts and alkali metal salts of peroxodisulfuric acid, such as sodium peroxodisulfate and hydrogen peroxide, or organic peroxides, such as tert-butyl hydroperoxide.

Preferred reducing components include, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid.

In a particular preferred embodiment, the initiating system comprises as reducing agent at least one bisulfite compound.

The redox initiator systems can be used in combination with soluble metal compounds whose metallic component is able to exist in a plurality of valence states. Typical redox initiator systems are exemplified by ascorbic acid/iron(II) sulfate/sodium peroxodisulfate, tert-butyl hydroperoxide/sodium disulfite, and tert-butyl hydroperoxide/Na hydroxymethanesulfinate. The individual components, the reducing component, for example, may also be mixtures, an example being a mixture of the sodium salt of hydroxymethanesulfinic acid with sodium disulfite. A particular preferred redox initiator is sodium acetone bisulfite (NaABS) and tert-butyl hydroperoxide (tBHP).

The initiating systems comprising or consisting of a persulfate compound are usually selected from persulfate salts, also called peroxysulfate salts, such as the alkali metal salts and/or the ammonium salts thereof. A particular preferred persulfate initiator is sodium persulfate (NPS).

According to the invention, the polymer dispersion comprises the water insoluble polymer P in the form of dispersed polymer particles. Preferably, the volume average particle diameter of the polymer particles, as determined by dynamic light scattering (DLS), is in the range from 20 to 600 nm. More preferably, the volume average particle diameter, determined by DLS, is in the range from 20 to 300 nm, and even more preferably in the range from 50 to 250 nm. A common method is described in the ISO13321 standard. Common methods for dynamic light scattering are known to skilled persons.

The average particle diameter can be determined by means of photon correlation spectroscopy (PCS), also known as quasielastic light scattering (QELS) or dynamic light scattering (DLS). The measurement method is described in the ISO13321:2004 standard. The determination can be carried out using an HPPS (High Performance Particle Sizer), in which a highly diluted aqueous polymer dispersion (c~0.005%) is analyzed. Measurement configuration are e.g. HPPS from Malvern, automated, with continuous-flow cuvette and Gilson autosampler using the following parameters: measurement temperature 22.0° C., measurement time 120 seconds (6 cycles each of 20 s), scattering angle 173°, wavelength laser 633 nm (HeNe), refractive index of medium 1.332 (aqueous), viscosity 0.9546 mPas. The measurement gives an average value of the cumulant analysis (mean of fits). The mean of fits is an average, intensity-weighted particle diameter in nm, which corresponds to the volume-average or mass-average particle diameter.

The glass transition temperature $T_g$ of the polymer P, will depend on the desired use in a known manner and is generally in the range from −50 to +100° C., preferably in the range from 0 to +80° C., and more preferably in the range from +20 to +50° C. The glass transition temperature, as referred herein, means the midpoint temperature according to ASTM 3418/82, which is usually determined by means of differential scanning calorimetry (DSC). The glass transition temperature of a polymer may also be determined by dynamic-mechanical analysis (DMTA) in accordance with the method indicated in connection with the examples. The glass transition temperature may be set through appropriate selection of the monomers.

The present invention also relates to process for preparing an aqueous polymer dispersions as defined herein, comprising a free radical emulsion polymerization of ethylenically unsaturated monomers M.

For free radical emulsion polymerization an emulsion of monomers, and surfactants water is prepared, which is subjected to a free radical polymerization. The most common type of emulsion polymerization is an oil-in-water emulsion, wherein the monomers usually form the oil phase, which are emulsified (with optional surfactants) as droplets in a continuous phase of water. Emulsion polymerizations can be carried out in batch, semi-batch, and continuous processes.

Suitable free radical emulsion polymerizations are known to skilled persons. Typical emulsion polymerization methods are e.g. described in Ullmann's Encyclopedia of Industrial Chemistry; Polymerization Processes, 2. Modeling of Processes and Reactors; VCH. Particular emulsion polymerizations are those described herein.

Free radical emulsion polymerizations can be carried out in batch, semi-batch, and continuous processes.

Typically, an aqueous oil-in-water emulsion of the monomers is prepared, usually by mixing the monomers, water and a suitable amount of surfactant, and the emulsion is subjected to polymerization conditions, for example by adding a suitable initiating system, in particular a thermal polymerization initiator or a redox initiating system. For example, for performing a batch process, the emulsion is prepared and heated to polymerization temperature and the initiator is added, preferably during the course of the polymerization reaction. For semi-batch process, typically a portion of water and surfactant and optionally a part of the monomers are added to a polymerization vessel, the mixture is heated to polymerization conditions and the majority of the monomers, optionally as an emulsion, and the polymerization initiator, preferably as an aqueous solution are added in parallel to the polymerization reactor. In a semi-batch process, it is possible to add a portion of the monomers to the polymerization vessel, before the polymerization is started. In a semi-batch process, it is also possible to add a portion of the polymerization initiator to the polymerization vessel, before the polymerization is started. In a semi-batch process, the monomers may be added as such or preferably as an aqueous emulsion. This monomer emulsion typically has a monomer content in the range from 60% to 85% by weight and more particularly in the range from 65% to 80% by weight.

The emulsions polymerization can be performed without a seed latex or in the presence of a seed latex. In a preferred embodiment, the process is performed in the presence of a seed latex.

A seed latex is a polymer latex which is present in the aqueous polymerization medium. Usually the seed latex is present before the monomers are introduced into the polymerization vessel, for example, if the polymerization is conducted as a semi-batch process, before metering of the monomers M is started. The seed latex may help to better adjust the particle size or the final polymer latex obtained in the free-radical emulsion polymerization of the invention. It is also possible to add seed latex during polymerization, e.g. as a single shot or continuously, in order to achieve a broad particle size distribution.

Principally, every polymer latex may serve as a seed latex. For the purpose of the invention, preference is given to seed latices, where the particle size of the polymer particles is comparatively small. In particular, the volume average particle diameter of the polymer particles of the seed latex, as determined by dynamic light scattering, is preferably in the range from 10 to 80 nm, in particular form 10 to 50 nm. Preferably, the polymer particles of the seed latex is made of ethylenically unsaturated monomers, which comprise at least 95% by weight, based on the total weight of the monomers forming the seed latex, of one or more monomers M2 as defined herein. In the polymer particles of the seed latex particular comprise at least 95% by weight, based on the total weight of the monomers forming the seed latex, of at least one monomer M2 or of a mixture of at least one monomer M2 and one or more monomers M3, where the proportion of monomers M1b to M1a is at least 50% on a weight basis. A particular preferred seed latex is made of polystyrene homo and/or copolymers, especially of polystyrene.

Preferably, the seed latex is usually charged into the polymerization vessel bevor the metering of the monomers M is started. In particular, the seed latex is charged into the polymerization vessel followed by establishing the polymerization conditions and charging at least a portion of the free-radical initiator into the polymerization vessel bevor the metering of the monomers M is started.

The initiators are used mostly in the form of aqueous solutions, the lower concentration being determined by the amount of water that is acceptable in the dispersion, and the upper concentration by the solubility of the respective compound in water. Generally speaking, the concentration is 0.1% to 30%, preferably 0.5% to 20%, more preferably 1.0% to 10%, by weight, based on the solution.

The amount of initiators is generally 0.1% to 10% by weight, preferably 0.2% to 5% by weight, based on the monomers to be polymerized. It is also possible for two or more different initiators to be used for the emulsion polymerization.

Usually, the polymer dispersions, and also the emulsions subjected to free radical emulsion polymerization from which the polymer dispersion is obtained, further comprise at least one surface-active substance, hereinafter also termed surfactant, for the purpose of stabilizing the polymer particles of the polymer. These substances include ionic and nonionic emulsifiers and also ionic and nonionic protective colloids or stabilizers. Emulsifiers, in contrast to protective colloids, are surface-active substances whose molecular weight (numerical average) is typically below 2000 g/mol and especially below 1500 g/mol. Protective colloids in turn are typically water-soluble polymers having a number-average molecular weight of more than 2000 g/mol, e.g., in the range from 2000 to 100 000 g/mol, and more particularly in the range from 5000 to 50 000 g/mol. It is of course possible to use protective colloids and emulsifiers in a mixture.

The amount of surface-active substance is typically in the range from 0.1% to 10% by weight, preferably 0.2% to 5% by weight, based on 100% by weight of polymer, or on 100% by weight of the monomers M that constitute the polymer.

The aqueous polymer dispersions of the present invention preferably comprise exclusively emulsifiers as surface-active substances. In particular, it has been found beneficial for the polymer dispersion to include a combination of at least one anionic and at least one nonionic emulsifier as surface-active substances. The emulsifiers are in general not polymerizable—that is, they contain no ethylenically unsaturated groups that are polymerizable in a free-radical polymerization. Part or the entirety of the emulsifiers, however, may be polymerizable. Polymerizable emulsifiers of this kind comprise ethylenically unsaturated groups and are either nonionic or anionic emulsifiers.

Polymerizable nonionic emulsifiers are preferably selected from $C_2$-$C_3$ alkoxylates of alkenols, more particularly of prop-2-en-1-ol, and monoesters of monoethylenically unsaturated monocarboxylic or dicarboxylic acids with poly-$C_2$-$C_3$ alkylene ethers, the degree of alkoxylation being generally 3 to 100 in each case. Polymerizable anionic emulsifiers are preferably selected from the corresponding sulfuric and phosphoric monoesters of the aforementioned nonionic polymerizable emulsifiers.

The nonpolymerizable anionic emulsifiers typically include aliphatic carboxylic acids having in general at least 10 C atoms, and also their salts, more particularly their ammonium salts and alkali metal salts, aliphatic, araliphatic, and aromatic sulfonic acids having generally at least 6 C atoms, and also their salts, more particularly their ammonium salts and alkali metal salts, sulfuric monoesters with ethoxylated alkanols and alkylphenols, and also their salts, more particularly their ammonium salts and alkali metal salts, and also alkyl, aralkyl, and aryl phosphates, including phosphoric monoesters of alkanols and alkylphenols.

Examples of suitable anionic emulsifiers are as follows: alkali metal salts and ammonium salts of dialkyl esters of sulfosuccinic acid, alkali metal salts and ammonium salts of alkyl sulfates (alkyl radical: $C_8$ to $C_{18}$), alkali metal salts and ammonium salts of sulfuric monoesters with ethoxylated alkanols (EO degree: 4 to 30, alkyl radical: $C_8$ to $C_{18}$), alkali metal salts and ammonium salts of sulfuric monoesters with ethoxylated alkyl phenols (EO degree: 3 to 50, alkyl radical: $C_4$ to $C_{16}$), alkali metal salts and ammonium salts of alkylsulfonic acids (alkyl radical: $C_8$ to $C_{18}$), and of alkylarylsulfonic acids (alkyl radical: $C_4$ to $C_{18}$). Examples of suitable anionic emulsifiers are also the below-specified compounds of the general formula

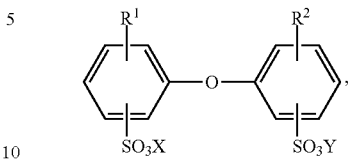

in which $R^1$ and $R^2$ are hydrogen or $C_4$ to $C_{14}$ alkyl and are not simultaneously hydrogen, and X and Y may be alkali metal ions and/or ammonium ions. Preferably $R^1$ and $R^2$ are hydrogen or linear or branched alkyl radicals having 6 to 18 C atoms and more particularly having 6, 12 and 16 C atoms, $R^1$ and $R^2$ not both simultaneously being hydrogen. X and Y are preferably sodium, potassium or ammonium ions, with sodium being particularly preferred. Particularly advantageous compounds are those in which X and Y are sodium, $R^1$ is a branched alkyl radical having 12 C atoms, and $R^2$ is hydrogen or has one of the non-hydrogen definitions stated for $R^1$. Frequently, technical mixtures are used which contain a fraction of 50% to 90% by weight of the monoalkylated product, for example, Dowfax® 2A1 (trade mark of the Dow Chemical Company).

Suitable nonionic emulsifiers are typically ethoxylated alkanols having 8 to 36 C atoms in the alkyl radical, ethoxylated mono-, di-, and trialkylphenols having typically 4 to 12 C atoms in the alkyl radicals, the ethoxylated alkanols and alkylphenols typically having a degree of ethoxylation in the range from 3 to 50.

Further suitable emulsifiers are found, for example, in Houben-Weyl, Methoden der organischen Chemie, Volume 14/1, Makromolekulare Stoffe [Macromolecular compounds], Georg Thieme Verlag, Stuttgart, 1961, pp. 192 to 208.

In the free radical emulsion polymerization of the invention it is possible to use regulators, also termed chain regulators, which result in reduced molecular weights of the polymers formed during free radical emulsion polymerization. If regulators are used, they will be typically used in amounts of >0% to 1% by weight, for example, based on the monomers M to be polymerized. Suitable regulators are, for example, compounds having a thiol group such as tert-butyl mercaptan, mercaptoethanol, thioglycolic acid, ethyl thioglycolate, mercaptopropyltrimethoxysilane, and tert-dodecyl mercaptan. It may be of advantage to add the regulator in the course of the polymerization over a relatively long period, for example, in parallel to the addition of the monomers M. The addition may then be made at a continuous feed rate or with an increasing or decreasing feed rate.

The process of the invention is preferably performed as a feed process, which means that at least 90% of the monomers M to be polymerized are added to the polymerization reactor in the course of the polymerization under polymerization conditions. The addition of the monomers may be made continuously, stepwise or in stages. In the course of the polymerization the monomer composition may be altered once, a number of times or else continuously (gradient procedure).

According to a preferred procedure of the process of the invention, an initial charge of a previously produced seed polymer in the form of an aqueous dispersion, optionally together with water is initially charged into the polymerization vessel. Alternatively the seed polymer can be prepared beforehand in situ by emulsion polymerization, preferably using a small portion of the monomers M. Following initial introduction or synthesis of the seed polymer, the initial charge is heated to polymerization temperature, if this has not already been done, and then a portion of the polymerization initiator is added, e.g., 1% to 20% and more particularly 5% to 15% by weight, based on the total amount of the initiator. An alternative procedure is adding a portion of the polymerization initiator first and then heating to polymerization temperature. At this point the polymerization vessel preferably contains less than 5% by weight of the monomers M to be polymerized. Subsequently the monomers to be polymerized are added to the polymerization reactor under polymerization conditions. The addition is usually performed over a relatively long period of usually at least 30 minutes, e.g. a period in the range from 30 minutes to 10 hours, more particularly over a period of 1 h to 6 h. The addition may be performed with a constant, increasing or decreasing rate of addition. In a first preferred embodiment, the addition is made at the beginning of the polymerization with increasing feed rate. In another, likewise preferred embodiment of the process of the invention, the addition is made at a constant rate of addition.

In a feed process, the monomers can be added as they are. Preferably the monomers are added in the form of an aqueous monomer emulsion which typically comprises at least part, preferably at least 70% by weight, of the surface-active substances used in the emulsion polymerization. This monomer emulsion typically has a monomer content in the range from 60% to 85% by weight and more particularly in the range from 65% to 80% by weight. It is possible to add the monomers or the monomer emulsion to the polymerization reactor by way of two or more feeds, in which case the monomer composition of the individual feeds will usually differ from each other. In general, however, it is sufficient to add the monomers as a mixture via one feed to the polymerization reactor. Where the monomers are added in the form of an aqueous emulsion to the polymerization reactor, it can be of advantage to emulsify the monomers afresh directly before they are added and at the rate at which they are added in the polymerization reactor, by a continuous process, for example. The monomer emulsion can also be first prepared and then introduced at the desired rate of addition into the polymerization reactor.

Typically, parallel to the addition of monomer, at least a portion or the entirety of the polymerization initiator is added. At least 80% of the polymerization initiator needed for the emulsion polymerization is typically added, more particularly 85% to 95% of the polymerization initiator, to the polymerization reactor in the course of the polymerization reaction. The polymerization initiator may be added with a constant rate of addition or with a changing rate of addition—for example, a decreasing or increasing rate.

Polymerization temperature and polymerization pressure are of minor importance and will depend from the type of monomers and in particular from the polymerization initiator, as thermal initiators typically require higher temperatures than redox initiators. The emulsion polymerization takes place typically at temperatures in the range from 30 to 130, preferably in the range from 50 to 100° C. The polymerization pressure is customarily in the region of atmospheric pressure, i.e., at ambient pressure, but may also be slightly above or below, in the range, for example, of 800 to 1500 mbar.

The polymerization medium may be composed either just of water or of mixtures of water and water-miscible liquids such as methanol. Preferably the amount of water in the reaction medium is at least 90% by weight, based on the total amount of water and water-miscible liquid. It is most preferred to use just water, which of course may contain one or more surfactant.

After the end of the actual polymerization reaction, i.e., after the end of the addition of the monomers to be polymerized, or after a conversion of the monomers present in the polymerization reactor of at least 95%, it may be beneficial to carry out a chemical and/or physical deodorization for the purpose of removing unpolymerized monomers.

In general at least one chemical deodorization will be performed. A chemical deodorization is a postpolymerization phase which is initiated by adding at least one further polymerization initiator, more particularly one of the aforementioned redox initiator systems. Processes for doing this are known, from DE-A-4435422, DE-A-4435423, and DE-A-4419518, for example. The reduction in residual monomers can also be accomplished by combined measures of a chemical and physical deodorization, in which case the physical deodorization is preferably carried out after the chemical deodorization. The resulting polymer dispersions comprise preferably less than 1500 ppm, more particularly less than 1000 ppm, and more preferably less than 500 ppm of volatile organic components, TVOC. By TVOC (total volatile organic compounds) are meant all organic compounds having a boiling point of not more than 250° C. at 1 bar. The determination of the residual-volatile content is made typically in accordance with DIN 55649.

It has additionally proven advantageous if the aqueous polymer dispersion, after it has been prepared, is stabilized by addition of an anionic surface-active substance.

In a preferred embodiment, a part of the disulfide moieties of the polymer P are partially reduced to thiol moieties. Without being bound to theory, it is believed that the disulfide moieties are reduced during the polymerization process, for example, by a reducing compound that may be a component of the initiating system or by side reactions during the polymerization.

The invention also relates to solid polymer compositions in powder form, obtainable by drying the polymer dispersion as defined herein. For certain applications, it may be advantageous, rather than the aqueous polymer dispersion of the invention, to use the composition as solid composition in powder form comprising a water-insoluble polymer (P) as herein defined. Such powders may for example be prepared by removing water and, optionally, other volatile components from the aqueous polymer dispersion, by means of a conventional drying process for powder preparation, preferably by a spray drying process. In a particular alternative, the solid polymer composition in powder form comprises no further compounds than the polymer dispersion from which is was obtained. In another particular alternative, the solid polymer composition in powder form comprises further compounds such as stabilizers, dyes, fillers, colorants, including pigments, flow control agents, thickeners, biocides, and, optionally, further auxiliaries. Further additives suitable are, for example, setting retarders and tackifiers.

The invention also relates to the use of polymer dispersions as defined herein or of dispersions which are obtainable by a process as defined herein or of solid powder compositions as defined herein, in coating materials, in particular as a binder in aqueous coating compositions.

The invention also relates to the use of polymer dispersions as defined herein or of dispersions which are obtainable by a process as defined herein or of solid powder compositions as defined herein, in adhesives, in particular in water-based adhesives.

The invention also relates to the use of polymer dispersions as defined herein or of dispersions which are obtainable by a process as defined herein or of solid powder compositions as defined herein, in sealants, in particular as a binder in flexible sealants.

The invention also relates to the use of polymer dispersions as defined herein or of dispersions which are obtainable by a process as defined herein or of solid powder compositions as defined herein, for producing a polymer-consolidated nonwoven fabric.

The invention also relates to the use of polymer dispersions as defined herein or of dispersions which are obtainable by a process as defined herein or of solid powder compositions as defined herein, for modifying an inorganic, hydraulically setting binder.

The polymer dispersions of the invention are also suitable for a number of applications in which aqueous polymer dispersions are typically used as binders, e.g., in coating materials, such as, paints for internal and external applications, paper coating slips, leather and textile coating systems, printing inks, coating systems for mineral moldings, primers for coating metals, as binders in the production of polymer-bonded nonwoven fabrics, as base materials for adhesive, as additives for inorganic, hydraulic binders, such as $CaSO_4 0.5\ H_2O$, anhydrite or cement, such as Portland cement, and for the hydraulically setting compositions produced therefrom such as plaster or concrete, as additives for clay or loam construction materials, for producing membranes, and the like.

Suitable coating materials and coating compositions, respectively, are e.g. paints, lacquers, varnishes, paper coatings, printing inks, leather coating systems, coating materials for textiles, coating systems for mineral moldings such as fiber cement slabs and concrete roofing shingles, anticorrosion primers for metals, coatings for wood, glass or plastic substrates.

Suitable uses for producing polymer-consolidated nonwoven fabrics comprise the treatment of the unbonded nonwoven fabrics, for example, by spraying, dipping, impregnating or padding or by treatment of the nonwoven fabrics with the polymer dispersion.

Preferably, the polymer dispersion is used in applications and/or products are paints for internal and external applications, aqueous surface coating materials, paper coating slips, leather and textile coating systems, coatings for wood, glass or plastic substrates, printing inks, coating systems for mineral moldings, primers for coating metals, binders in the production of polymer-bonded nonwoven fabrics, base materials for adhesive, additives for inorganic, hydraulic binders and for the hydraulically setting compositions produced therefrom, as additives for clay or loam construction materials, for producing membranes, and the like.

A further object of the invention relates to a method of coating a surface of a substrate which comprises applying an aqueous coating composition, which contains an aqueous polymer dispersion as defined herein as a binder, and allowing the thus obtained wet coating to dry in the presence of oxygen.

Suitable surfaces are for example as wood, glass, metal, plastic, mineral, paper, and foils.

Besides the polymer dispersion, the surface coating formulations may comprise further ingredients, which are conventionally used in surface coating materials based on aqueous polymer dispersions. These ingredients include pigments, fillers, further auxiliaries, and, optionally, additional film-forming polymers.

Suitable pigments are, for example, inorganic white pigments such as titanium dioxide, preferably in the rutile form, barium sulfate, zinc oxide, zinc sulfide, basic lead carbonate, antimony trioxide, lithopones (zinc sulfide+barium sulfate) or colored pigments, examples being iron oxides, carbon black, graphite, zinc yellow, zinc green, ultramarine, manganese black, antimony black, manganese violet, Paris blue or Schweinfurt green. As well as the inorganic pigments, the emulsion paints of the invention may also comprise organic color pigments, examples being sepia, gamboge, Cassel brown, toluidine red, parared, Hansa yellow, indigo, azo dyes, anthraquinonoid and indigoida dyes, and also dioxazine, quinacridone, phthalocyanine, isoindolinone, and metal-complex pigments. Also suitable are synthetic white pigments with air inclusions for increasing the light scattering, such as the Rhopaque® dispersions. Suitable fillers are, for example, aluminosilicates, such as feldspars, silicates, such as kaolin, talc, mica, magnesite, alkaline earth metal carbonates, such as calcium carbonate, in the form of calcite or chalk, for example, magnesium carbonate, dolomite, alkaline earth metal sulfates, such as calcium sulfate, silicon dioxide, etc. In surface coating materials, of course, finely divided fillers are preferred. The fillers can be used as individual components. In actual practice, however, filler mixtures have been found particularly appropriate, examples being calcium carbonate/kaolin, and calcium carbonate/talc. Glossy surface coating materials generally include only small amounts of very finely divided fillers, or comprise no fillers.

Finely divided fillers may also be used to increase the hiding power and/or to save on white pigments. In order to adjust the hiding power, the hue, and the depth of color, it is preferred to use blends of color pigments and fillers.

The typical auxiliaries, besides the emulsifiers used in the polymerization, also include wetting agents or dispersants, such as sodium, potassium or ammonium polyphosphates, alkali metal salts and ammonium salts of acrylic acid or maleic anhydride copolymers, polyphosphonates, such as sodium 1-hydroxyethane-1,1-diphosphonate, and salts of naphthalenesulfonic acids, more particularly their sodium salts.

Further suitable auxiliaries are flow control agents, defoamers, biocides, thickeners, and film-forming assistants. Examples of suitable thickeners are associative thickeners, such as polyurethane thickeners. The amount of the thickener is preferably less than 1% by weight, more preferably less than 0.6% by weight, based on the solids content of the surface coating material. Suitable film-forming assistants are, in particular, organic solvents which lower the film-forming temperature of the coating material. They include, in particular, aromatic and aliphatic hydrocarbon solvents and aliphatic esters, especially dialkyl dicarboxylates, the film-forming agents typically having boiling points (under atmospheric pressure) in the range from 80 to 250° C. and being used in an amount of 0.5% to 10% by weight, based on the polymer (P).

The fraction of pigments may be described through the pigment volume concentration (PVC). The PVC describes the ratio of the volume of pigments ($V_P$) and fillers ($V_F$) to the total volume, consisting of the volumes of binder ($V_B$), pigments, and fillers in a dried coating film, in percent: $PVC=(V_P+V_F)\times 100/(V_P+V_F+V_B)$ (cf. Ullmann's Enzyklopädie der technischen Chemie, 4th edition, Volume 15, p. 667). Surface coating materials can be divided up according to the PVC, for example, as follows:

highly filled interior paint, wash resistant, white/matt: about 85 interior paint, scrub resistant, white/matt: about 60-85
semigloss paint, silk-matt: about 30-60
semigloss paint, silk-gloss: about 25-35
gloss paint: about 15-25
exterior masonry paint, white: about 45-55
clear varnish: 0

The surface coating materials of the invention may have the form, for example, of an unpigmented system (clear varnish) or of a pigmented system.

One subject of the invention concerns a surface coating material in the form of an aqueous composition comprising:
- at least one binder composition of the invention,
- at least one inorganic filler and/or at least one inorganic pigment,
- at least one typical auxiliary, and
- water.

Preference is given to a surface coating material comprising:
- 10% to 60% by weight of at least one binder composition of the invention (polymer content 40 to 75% by weight),
- 10% to 70% by weight of inorganic fillers and/or inorganic pigments,
- 0.1% to 20% by weight of typical auxiliaries, and
- water to 100% by weight.

One embodiment of the present invention are surface coating materials in the form of an emulsion paint. Emulsion paints generally comprise 30 to 75% by weight and preferably 40 to 65% by weight of nonvolatiles. By these are meant all constituents of the formulation that are not water, but at least the total weight of binder, filler, pigment, low-volatility solvents (boiling point above 220° C.), plasticizers for example, and polymeric auxiliaries. Of these figures, the amounts accounted for by each of the constituents are as follows:
a) 3 to 90%, more particularly 10 to 60%, by weight by the polymer dispersion of the invention (polymer content 40 to 75% by weight),
b) 0 to 85%, preferably 5 to 60%, more particularly 10 to 50%, by weight by at least one inorganic pigment,
c) 0 to 85%, more particularly 5 to 60%, by weight by inorganic fillers, and
d) 0.1 to 40%, more particularly 0.5 to 20%, by weight by typical auxiliaries.

The binder compositions of the invention are especially suitable for producing masonry paints having a PVC in the range from 30 to 65 or interior paints having a PVC in the range from 65 to 80. In addition they are especially suitable for producing semigloss or gloss paints which have, for example, a PVC in the range from 12 to 35%, preferably 15 to 30%.

The surface coating materials of the invention are produced according to standard methods, e.g. by blending the components in mixing apparatus customary for the purpose. It has been found appropriate to prepare an aqueous paste or dispersion from the pigments, water, and, optionally, the auxiliaries, and only then to mix the polymeric binder, i.e., in general, the aqueous dispersion of the polymer, with the pigment paste or pigment dispersion.

The surface coating material of the invention can be applied to substrates in a usual way, as for example by spreading, spraying, dipping, rolling, knifecoating, etc.

The surface coating material of the invention is used preferably as an architectural coating material, i.e., to coat buildings or parts of buildings. The substrates in question may be mineral substrates such as renders, plaster or plasterboard, masonry or concrete, wood, wood base materials, metal or paper, wallpapers for example, or plastic, PVC for example.

Preference is given to using the surface coating materials of the invention to coat interior parts of buildings, such as interior walls, interior doors, paneling, banisters, furniture, etc.

The surface coating materials of the invention are notable for ease of handling, good processing properties, and high hiding power. Moreover, the pollutant content of the surface coating materials is low. They have good performance properties, such as good water resistance, good wet adhesion, good blocking resistance, good recoatability, for example, and exhibit good flow on application. The surface coating materials are also outstandingly suitable for producing anticorrosive coatings.

The coatings produced from the surface coating materials of the invention feature a combination of good adhesion with good abrasion resistance. Said coatings, moreover, generally feature high flexibility and low fragility, which allows them, for example, to conform to a working substrate.

Furthermore, the binder compositions of the invention are employed preferably in adhesives. The present invention accordingly further provides for the use of the here-described binder compositions in adhesive formulations.

The adhesive formulations are produced preferably with aqueous binder compositions, and may be composed solely of these compositions. However, besides the aqueous binder compositions, the adhesive formulations may also comprise further adjuvants, of the kind customary in adhesives based on aqueous polymer dispersions. These adjuvants include fillers, colorants, including pigments, flow control agents, thickeners, biocides, and, optionally, further auxiliaries. Examples of such adjuvants have already been stated above. Further additives suitable for the adhesive formulations are, for example, setting retarders, such as sodium gluconate, for instance, and also tackifiers (tackifying resins). The adhesive formulations may further comprise additional, application-specific additives, such as cement in adhesives for tiles and similar floor- and wallcoverings, for example.

Tackifiers are, for example, natural resins, such as rosins, and derivatives prepared therefrom by disproportionation, isomerization, polymerization, dimerization or hydrogenation. They may be present in their salt form (with monovalent or polyvalent counterions, for example) or, preferably, in their esterified form. Alcohols used for the esterification may be monohydric or polyhydric. Examples are methanol, ethanediol, diethylene glycol, triethylene glycol, 1,2,3-propanetriol, pentaerythritol. Also used as tackifiers are hydrocarbon resins, examples being coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene, and vinyltoluene. Other tackifiers which can be used are polyacrylates which have a low molar weight. Preferably these polyacrylates have a weight-average molecular weight Mw below 30 000. The polyacrylates are composed preferably of at least 60%, more particularly at least 80% by weight of $C_1$-$C_8$ alkyl (meth)acrylates. Preferred tackifiers are natural or chemically modified rosins. Rosins are composed predominantly of abietic acid or derivatives thereof. The amount by weight of the tackifiers is preferably 0 to 100 parts by weight, more preferably 0 to 50 parts by weight, per 100 parts by weight of polymer (solids/solids).

The adhesives of the invention may comprise one or more tackifiers or may be free from tackifier. If tackifiers have been added to them, they generally replace a portion of the polymer (P).

The aqueous polymer dispersions used for the adhesive formulations of the invention generally have a solids content of 45% to 80%, preferably of 50% to 75%, and more particularly of 55% to 72%, by weight.

The invention provides an adhesive in the form of an aqueous composition comprising:
- 20% to 70% by weight of at least one binder composition of the invention (polymer content 45% to 80% by weight),
- 0% to 60% by weight of at least one inorganic filler and/or at least one inorganic pigment,
- 0% to 30% by weight of a further auxiliary, and
- water to 100% by weight.

The adhesives and binder compositions of the invention are suitable in principle for producing adhesive coatings on any desired substrates such as papers, plastics, PVC for example, mineral substrates such as renders, plaster or plasterboard, masonry or concrete, wood, woodbase materials or metal.

The thickness of the coating of pressure-sensitive adhesive is dependent on the desired application and is situated typically in the range from 1 to 500 µm, more particularly in the range from 2 to 250 µm or 5 to 200 µm, corresponding to a coating of 1 to 500 g/m$^2$, more particularly 2 to 250 g/m$^2$, and especially 5 to 200 g/m$^2$.

Application of the binder compositions and adhesives to the substrates that are to be coated may take place by means of typical methods, such as by rolling, knifecoating, spreading, pouring, etc., for example. It is also possible first to apply the polymer dispersions or pressure-sensitive adhesives to a release sheet, such as a release paper, for example, and to transfer the layer of pressure-sensitive adhesive with this release medium to the desired substrate. The water comprised in the compositions is typically removed in a customary manner, such as by drying at temperature in the range from 10 to 150° C., more particularly in the range from 15 to 100° C.

The adhesives and binder compositions of the invention are especially suitable for bonding flexible floorcoverings, such as textile floorcoverings, examples being carpets, linoleum, rubber, polyolefin, CV, and PVC coverings, and also rigid floor coverings, such as woodblock floorings, and tiles. They are therefore used preferably for bonding these floorcoverings to—in particular—the aforementioned mineral substrates or substrates of wood or wood base materials.

The glass transition temperature $T_g$ of the polymers (P) used for the flooring adhesives of the invention is, in the case of the adhesives for flexible coverings, typically <−5° C., preferably <−10° C., and more particularly <−15° C., and, in the case of the adhesives for rigid coverings, woodblock flooring more particularly, is typically <20° C., preferably <15° C., and in particular <10° C.

The adhesives of the invention have very good adhesive properties, in particular a good adhesion to the substrates to be bonded, and a high cohesion (internal strength in the layer of adhesive). Furthermore, they are easy to handle and have good processing properties. With respect to the bonding of flexible floorcoverings, they are distinguished relative to prior-art adhesives by significantly increased peel strength in tandem with consistently good further properties, especially the wet grab and dry grab. In the context of their use as an adhesive for rigid floorcoverings, adhesives of the invention exhibit improved ultimate strength.

The inventive use of boric acid and/or borate for external polymer crosslinking also makes it possible to formulate the adhesives of the invention as storage-stable one-component formulations. In contrast, in the case of prior-art adhesives, the crosslinker that forms covalent bonds must be stored in a second, separate component, since it would otherwise lead to premature, irreversible curing.

The binder compositions of the invention are also suitable in particular for producing polymer-bonded nonwoven fabrics or nonwovens.

For producing polymer-bonded nonwoven fabrics, for example, an unbonded nonwoven fabric is treated with at least one aqueous binder composition of the invention. The aqueous binder composition for this purpose is used generally in an amount of 0.5% to 30%, preferably 1.5% to 20%, by weight, based on the weight of the nonwoven material and calculated as solids content of the binder composition. The binder is used to consolidate the nonwoven fabrics. The treatment of the unbonded nonwoven fabrics may take place, for example, by spraying, dipping, impregnating or padding or by treatment of the nonwoven fabrics with a binder composition in the form of a foam.

The unbonded nonwoven fabrics may be composed of natural and/or synthetic fibers. Examples of natural fibers are cellulosic fibers of various origins, such as chemical pulp and viscose rayon staple, and also fibers composed of cotton, hemp, jute, sisal, and wood, wool, and blends of at least two of the stated fiber types. Fibers used with preference from the group are fibers composed of jute, sisal, and wood. Examples of synthetic fibers are viscose, polyester, polyamide, polypropylene, polyethylene, polyacrylonitrile, and polyvinyl chloride fibers, and also carbon fibers, glass fibers, ceramic fibers, and mineral fibers, and also blends of at least two of the stated fiber types. For producing the bonded nonwoven fabrics it is preferred to use polyester fibers and also blends of polyester fibers and glass fibers. Polyester fibers may be obtained from recycled material by melt spinning and used to produce a nonwoven support material. The nonwoven materials may be composed, for example, of staple fibers or of spun fibers, and also of blends of these fiber types. Unbonded nonwoven fabrics are produced, as is known, mechanically by needling or water jet consolidation of a wet-laid or air-laid nonwoven material. The nonwoven materials have, for example, a basis weight of 10 to 700 g/m$^2$, preferably of 50 to 500 g/m$^2$. Usually the basis weight of the nonwoven materials prior to consolidation is 75 to 300 g/m$^2$.

The nonwoven fabrics treated with the binder composition of the invention are heated for consolidation to temperatures of in general in the range from 100° C. to 230° C., preferably 120 to 210° C. The heating time is dependent essentially on the temperature, the water content, and the particular fiber of which the nonwoven fabric is composed. The nonwoven fabrics treated with the binder composition of the invention are usually heated for 0.5 to 5, preferably 1.5 to 3, minutes. In the course of heating, water vapor escapes to start with, accompanied or followed by the filming of the polymer P present in the binder composition, which undergoes crosslinking with the boric acid and/or salts thereof.

Where the binders are used for nonwoven fabrics, the binder compositions of the invention may further comprise typical adjuvants, such as finely divided inert fillers, such as aluminum silicates, quartz, precipitated or fumed silica, light spar and heavy spar, talc, dolomite or calcium carbonate; color-imparting pigments, such as titanium white, zinc white, black iron oxide, etc., foam inhibitors; foam formers, thickeners; preservatives; lubricants and/or wetting agents.

For certain applications it is advantageous, rather than the aqueous binder composition of the invention, to use a solid binder composition in powder form, comprising a water-insoluble polymer (P) as herein defined, and boric acid or a salt of boric acid. Such powders may for example be prepared by removing water and, optionally, other volatile components from the aqueous binder composition, preferably by means of a conventional drying process for powder preparation, more particularly by a spray drying process. Alternatively an aqueous dispersion of the polymer can first be converted to a powder by a suitable drying process and, during or after the drying process, the powder can be admixed with the desired amount of boric acid or a salt thereof. These solid binder compositions in powder form are employed, for example, in inorganic, hydraulically setting binders such as calcium sulfate semihydrate, anhydrite or cement, since they endow the binding construction materials produced therefrom, such as concrete, cement plasters, and gypsum-containing materials, with advantageous physical properties, especially improved strength, such as tensile strength and breaking strength.

ABBREVIATIONS USED

ADDH adipinic acid dihydrazide
BA butyl acrylate
BDDA 1,4-butanediol diacrylate
DAAM diacetone acrylic amide
DSDMA disulfide diethanol dimethacrylate
EDGMA ethylene glycol dimethacrylate
EHTG 2-ethylhexyl thioglycolate
HDDA 1,6-hexanediol diacrylate
HEMA hydroxyethyl methacrylate
MAA methacrylic acid
MMA methyl methacrylate
NaABS sodium acetone bisulfite
NaPS sodium persulfate, also sodium peroxodisulfate
SS styrene seed
tBHP tert-butyl hydroperoxide

CHEMICALS USED

Emulsifier E1: 32% by weight aqueous solution of sodium lauryl ether polyglycol ether sulfate
Emulsifier E2: 45% by weight aqueous solution the disodium salt of a disulfonated diphenylether bearing a Cu/Cu alkyl group

EXAMPLES

Example 1 (Comparative)

Preparation of an Aqueous Acrylic Dispersion without Crosslinking

A polymerization vessel equipped with metering apparatus, stirrer, and temperature regulation was charged at 20 to 25° C. (room temperature) under a nitrogen atmosphere with the initial charge (Z0, see below) which was then heated to 60° C. under stirring (150 rpm). When the temperature was reached, 1.11 g of a 10% strength by weight aqueous solution of tert-butyl hydroperoxide and 1.41 g of a 13.1% strength by weight aqueous solution of sodium acetone bisulfite were added and the batch was stirred for three minutes. Then, with the temperature maintained, feeds Z1, Z2 and Z3 were metered continuously over the course of 180 minutes at a constant flow rate. The polymerization mixture was then reacted at 60° C. for further 30 minutes. Thereafter, feed Z4 was added to the polymerization mixture to adjust a pH of 8.0 and the batch was stirred for five minutes. Subsequently, with the temperature maintained, feeds Z5 and Z6 were metered continuously into the polymerization mixture over the course of 60 minutes with a constant flow rate. The aqueous polymer dispersion was cooled to room temperature and filtered through a 125 µm filter.

Initial Charge (Z0):

| | |
|---|---|
| 307.29 g | deionized water |
| 11.21 g | 33% strength by weight aqueous solution of styrene seed |

Feed Z1 (Homogeneous Mixture of):

| | |
|---|---|
| 212.63 g | deionized water |
| 11.56 g | 32% strength by weight aqueous solution of emulsifier E1 |
| 8.22 g | 45% strength by weight aqueous solution of emulsifier E2 |
| 5.55 g | methacrylic acid |
| 123.95 g | methyl methacrylate |
| 240.50 g | n-butyl acrylate |

Feed Z2:

| | |
|---|---|
| 9.99 g | 10% strength by weight aqueous solution of tert-butyl hydroperoxide |

Feed Z3:

| | |
|---|---|
| 11.30 g | 13.1% strength by weight aqueous solution of sodium acetone bisulfite |

Feed Z4:

| | |
|---|---|
| 1.80 g | 25% strength by weight aqueous ammonia solution |

Feed Z5:

| | |
|---|---|
| 1.85 g | 10% strength by weight aqueous solution of tert-butyl hydroperoxide |

Feed Z6:

| | |
|---|---|
| 2.26 g | 13.1% strength by weight aqueous solution of sodium acetone bisulfite |

Thereby a polymer dispersion having a solids content of 39.7% by weight, a pH of 8.2, an average particle size of 137 nm (determined by means of HPPS) and a weight-average particle diameter of 137 nm (determined by means of HDC) was obtained. The glass transition temperature was 4° C. (determined by DSC) and the minimum film forming temperature was <0° C.

Example 2 (Comparative)

Preparation of an Aqueous Acrylic Dispersion with HDDA as Crosslinker

The dispersion was prepared by analogy to the procedure described in Example 1, except that a different monomer mixture containing HDDA crosslinker was used for Feed Z1.

Feed Z1 (Homogeneous Mixture of):

| | |
|---|---|
| 212.63 g | deionized water |
| 11.56 g | 32% strength by weight aqueous solution of emulsifier E1 |
| 8.22 g | 45% strength by weight aqueous solution of emulsifier E2 |
| 5.55 g | methacrylic acid |
| 14.43 g | hexanediol diacrylate (HDDA) |
| 116.74 g | methyl methacrylate |
| 233.39 g | n-butyl acrylate |

Thereby a polymer dispersion having a solids content of 39.7% by weight, a pH of 8.1, an average particle size of 139 nm (determined by means of HPPS) and a weight-average particle diameter of 144 nm (determined by means of HDC) was obtained. The glass transition temperature was −1° C. (determined by DSC) and the minimum film forming temperature was <0° C.

Example 3 (According to the Invention)

Preparation of an Aqueous Acrylic Dispersion with DSDMA as Crosslinker

The dispersion was prepared by analogy to the procedure described in Example 1, except that a different monomer mixture containing the disulfide crosslinker DSDMA was used for Feed Z1.

Feed Z1 (Homogeneous Mixture of):

| | |
|---|---|
| 212.63 g | deionized water |
| 11.56 g | 32% strength by weight aqueous solution of emulsifier E1 |
| 8.22 g | 45% strength by weight aqueous solution of emulsifier E2 |
| 5.55 g | methacrylic acid |
| 18.50 g | disulfide diethanol dimethacrylate (DSDMA) |
| 114.70 g | methyl methacrylate |
| 231.25 g | n-butyl acrylate |

Thereby a polymer dispersion having a solids content of 39.6% by weight, a pH of 8.2, an average particle size of 140 nm (determined by means of HPPS) and a weight-average particle diameter of 137 nm (determined by means of HDC) was obtained. The glass transition temperature was 2° C. (determined by DSC) and the minimum film forming temperature was <0° C.

Example 4 (Comparative)

Preparation of an Aqueous Acrylic Dispersion with DAAM/ADDH as Crosslinker

The dispersion was prepared by analogy to the procedure described in Example 1, except for the following three changes: A lower water amount was used for the pre-charge (Z0) and a different monomer mixture containing the disulfide crosslinker DSDMA was used for Feed Z1. In addition, after cooling down and before filtration, a Feed Z7 was added and the dispersion was then stirred for 10 minutes at room temperature before the filtration.

Initial Charge (Z0):

300.68 g deionized water 11.21 g 33% strength by weight aqueous solution of styrene seed Feed Z1 (Homogeneous Mixture of):

| | |
|---|---|
| 212.63 g | deionized water |
| 11.56 g | 32% strength by weight aqueous solution of emulsifier E1 |
| 8.22 g | 45% strength by weight aqueous solution of emulsifier E2 |
| 5.55 g | methacrylic acid |
| 107.30 g | 20% strength by weight aqueous solution of diacetone acrylamide (DAAM) |
| 113.22 g | methyl methacrylate |
| 229.77 g | n-butyl acrylate |

Feed Z7:

| | |
|---|---|
| 89.42 g | 12% strength by weight aqueous solution of adipic acid dihydrazide (ADDH) |

Thereby a polymer dispersion having a solids content of 39.0% by weight, a pH of 8.3, an average particle size of 136 nm (determined by means of HPPS) and a weight-average particle diameter of 137 nm (determined by means of HDC) was obtained. The glass transition temperature was 4° C. (determined by DSC) and the minimum film forming temperature was <0° C.

Example 5 (Comparative)

Preparation of an Aqueous Acrylic Dispersion with HDDA as Crosslinker

The dispersion was prepared by analogy to the procedure described in Example 1, except that a different monomer mixture containing HDDA crosslinker was used for Feed Z1.

Feed Z1 (Homogeneous Mixture of):

| | |
|---|---|
| 212.63 g | deionized water |
| 11.56 g | 32% strength by weight aqueous solution of emulsifier E1 |
| 8.22 g | 45% strength by weight aqueous solution of emulsifier E2 |
| 5.55 g | methacrylic acid |
| 43.29 g | hexanediol diacrylate (HDDA) |
| 102.31 g | methyl methacrylate |
| 218.86 g | n-butyl acrylate |

Thereby a polymer dispersion having a solids content of 40.0% by weight, a pH of 8.3, an average particle size of 148 nm (determined by means of HPPS) and a weight-average particle diameter of 145 nm (determined by means of HDC) was obtained. The glass transition temperature was 4° C. (determined by DSC) and the minimum film forming temperature was <0° C.

Example 6 (According to the Invention)

Preparation of an Aqueous Acrylic Dispersion with DSDMA as Crosslinker

The dispersion was prepared by analogy to the procedure described in Example 1, except that a different monomer mixture containing the disulfide crosslinker DSDMA was used in Feed Z1.

Feed Z1 (Homogeneous Mixture of):

| | |
|---|---|
| 212.63 g | deionized water |
| 11.56 g | 32% strength by weight aqueous solution of emulsifier E1 |
| 8.22 g | 45% strength by weight aqueous solution of emulsifier E2 |
| 5.55 g | methacrylic acid |
| 55.50 g | disulfide diethanol dimethacrylate (DSDMA) |
| 96.20 g | methyl methacrylate |
| 212.75 g | n-butyl acrylate |

Thereby a polymer dispersion having a solids content of 40.1% by weight, a pH of 8.2, an average particle size of 145 nm (determined by means of HPPS) and a weight-average particle diameter of 139 nm (determined by means of HDC) was obtained. The glass transition temperature was 11° C. (determined by DSC) and the minimum film forming temperature was 3° C.

Example 7 (Comparative)

Preparation of an Aqueous Acrylic Dispersion with DAAM/ADDH as Crosslinker

The dispersion was prepared by analogy to the procedure described in Example 1, except for the following three changes: A lower water amount was used for the pre-charge (Z0) and a different monomer mixture containing DAAM was used for Feed Z1. In addition, after cooling down and before filtration, a Feed Z7 was added and the dispersion was then stirred for 10 min at room temperature before filtration.

Initial charge (Z0):

| | |
|---|---|
| 300.68 g | deionized water |
| 11.21 g | 33% strength by weight aqueous solution of styrene seed |

Feed Z1 (Homogeneous Mixture of):

| | |
|---|---|
| 156.33 g | deionized water |
| 11.56 g | 32% strength by weight aqueous solution of emulsifier E1 |
| 8.22 g | 45% strength by weight aqueous solution of emulsifier E2 |
| 5.55 g | methacrylic acid |
| 64.38 g | diacetone acrylamide (DAAM) |
| 91.76 g | methyl methacrylate |
| 208.31 g | n-butyl acrylate |

Feed Z7:

| | |
|---|---|
| 142.43 g | 22.6% strength by weight aqueous solution of adipic acid dihydrazide (ADDH) |

Thereby yielded a polymer dispersion having a solids content of 40.6% by weight, a pH of 8.0, an average particle size of 137 nm (determined by means of HPPS) and a weight-average particle diameter of 142 nm (determined by means of HDC) was obtained. The glass transition temperature was 21° C. (determined by DSC) and the minimum film forming temperature was <0° C.

Example 8 (Comparative)

Preparation of an Aqueous Acrylic Dispersion with DAAM/ADDH as Crosslinker

A polymerization vessel equipped with metering apparatus, stirrer, and temperature regulation was charged at 20 to 25° C. (room temperature) under a nitrogen atmosphere with the initial charge (Z0, see below) which was then heated to 85° C. under stirring (150 rpm). When the temperature was reached, 1.17 g of a 7% strength by weight aqueous solution of sodium persulfate was added and the batch was stirred for two minutes. Then, with the temperature maintained, feeds Z1 and Z2 were metered continuously over the course of 150 minutes at a constant flow rate. After the end of the feeding time, feed Z3 was added. The polymerization mixture was then reacted at a temperature of 85° C. for further 45 minutes. Thereafter, feed Z4 was added to the polymerization mixture. The mixture was cooled down and feed Z5 was added. The pH was then adjusted to 8.0 by adding Z6. The dispersion was stirred for 10 min at room temperature and filtered through a 125 μm filter.

Initial Charge (Z0):

| | |
|---|---|
| 372.80 g | deionized water |
| 37.12 g | 33% strength by weight aqueous solution of styrene seed |

Feed Z1 (Homogeneous Mixture of):

| | |
|---|---|
| 77.78 g | deionized water |
| 12.76 g | 32% strength by weight aqueous solution of emulsifier E1 |
| 9.07 g | 45% strength by weight aqueous solution of emulsifier E2 |
| 12.25 g | methacrylic acid |
| 118.41 g | diacetone acrylamide (DAAM) |
| 207.01 g | methyl methacrylate |
| 165.36 g | n-butyl acrylate |

Feed Z2:

| | |
|---|---|
| 28.00 g | 7% strength by weight aqueous solution of sodium persulfate |

Feed Z3:

| | |
|---|---|
| 4.27 g | deionized water |

Feed Z4:

| | |
|---|---|
| 4.00 g | deionized water |

Feed Z5:

| | |
|---|---|
| 54.92 g | 12% strength by weight aqueous solution of adipic acid dihydrazide (ADDH) |

Feed Z6:

| | |
|---|---|
| 4.20 g | 25% strength by weight aqueous solution of ammonia |

Thereby a polymer dispersion having a solids content of 39.5% by weight, a pH of 8.0, an average particle size of 95 nm (determined by means of HPPS) and a weight-average particle diameter of 86 nm (determined by means of HDC) was obtained. The glass transition temperature was 41° C. (determined by DSC) and the minimum film forming temperature was 22° C.

Example 9 (According to the Invention)

Preparation of an Aqueous Acrylic Dispersion with DSDMA as Crosslinker

A polymerization vessel equipped with metering apparatus, stirrer, and temperature regulation was charged at 20 to 25° C. under a nitrogen atmosphere with the initial charge (Z0, see below) which was then heated to 85° C. under stirring (150 rpm). When the temperature was reached, 1.17 g of a 7% strength by weight aqueous solution of sodium persulfate was added and the batch was stirred for 2 minutes. Then, with the temperature maintained, feeds Z1 and Z2 were metered continuously over the course of 150 minutes at a constant flow rate. After the end of the feeding time, feed Z3 was added. The polymerization mixture was then reacted at a temperature of 85° C. for further 45 minutes. Thereafter, feed Z4 was added to the polymerization mixture. The mixture was cooled down and the pH was then adjusted to 8.0 by adding Z5. The dispersion was stirred for 10 min at room temperature and filtered through a 125 μm filter.

Initial Charge (Z0):

| | |
|---|---|
| 372.80 g | deionized water |
| 37.12 g | 33% strength by weight aqueous solution of styrene seed |

Feed Z1 (Homogeneous Mixture of):

| | |
|---|---|
| 172.45 g | deionized water |
| 12.76 g | 32% strength by weight aqueous solution of emulsifier E1 |
| 9.07 g | 45% strength by weight aqueous solution of emulsifier E2 |
| 12.25 g | methacrylic acid |
| 20.42 g | disulfide diethanol dimethacrylate (DSDMA) |
| 210.271 g | methyl methacrylate |
| 165.36 g | n-butyl acrylate |

Feed Z2:

| | |
|---|---|
| 28.00 g | 7% strength by weight aqueous solution of sodium persulfate |

Feed Z3:

| | |
|---|---|
| 20.13 g | deionized water |

Feed Z4:

| | |
|---|---|
| 13.52 g | deionized water |

Feed Z5:

| | |
|---|---|
| 4.20 g | 25% strength by weight aqueous solution of ammonia |

Thereby a polymer dispersion having a solids content of 38.4% by weight, a pH of 7.9, an average particle size of 94 nm (determined by means of HPPS) and a weight-average particle diameter of 86 nm (determined by means of HDC) was obtained. The glass transition temperature was 38° C. (determined by DSC) and the minimum film forming temperature was 29° C.

Example 10 (According to the Invention)

Preparation of an Aqueous Acrylic Dispersion with DSDMA as Crosslinker

The dispersion was prepared by analogy to the procedure described in Example 1, except that a different monomer mixture containing the disulfide crosslinker DSDMA was used for Feed Z1.

Feed Z1 (Homogeneous Mixture of):

| | |
|---|---|
| 212.63 g | deionized water |
| 11.56 g | 32% strength by weight aqueous solution of emulsifier E1 |
| 8.22 g | 45% strength by weight aqueous solution of emulsifier E2 |
| 5.55 g | methacrylic acid |
| 37.00 g | disulfide diethanol dimethacrylate (DSDMA) |
| 105.45 g | methyl methacrylate |
| 222.00 g | n-butyl acrylate |

Thereby a polymer dispersion having a solids content of 39.8% by weight, a pH of 8.2, an average particle size of 142 nm (determined by means of HPPS) and a weight-average particle diameter of 140 nm (determined by means of HDC) was obtained. The glass transition temperature was 8° C. (determined by DSC) and the minimum film forming temperature was 0° C.

Example 11 (According to the Invention)

Preparation of an Aqueous Acrylic Dispersion with DSDMA as Crosslinker

The dispersion was prepared by analogy to the procedure described in Example 1, except that a different monomer mixture containing the disulfide crosslinker DSDMA was used for feed Z1. In addition, after the end of feeds Z5 and Z6, an additional feed Z7 was metered continuously over the course of 30 minutes at a constant flow rate. After the end of feed Z7 the dispersion was stirred at 60° C. for another 30 min before cooling down and filtration.

Feed Z1 (Homogeneous Mixture of):

| | |
|---|---|
| 212.63 g | deionized water |
| 11.56 g | 32% strength by weight aqueous solution of emulsifier E1 |
| 8.22 g | 45% strength by weight aqueous solution of emulsifier E2 |
| 5.55 g | methacrylic acid |
| 37.00 g | disulfide diethanol dimethacrylate (DSDMA) |
| 105.45 g | methyl methacrylate |
| 222.00 g | n-butyl acrylate |

Feed Z7:

| | |
|---|---|
| 14.12 g | 13.1% strength by weight aqueous solution of sodium acetone bisulfite |

Thereby a polymer dispersion having a solids content of 39.5% by weight, a pH of 7.5, an average particle size of 142 nm (determined by means of HPPS) and a weight-average particle diameter of 140 nm (determined by means of HDC) was obtained. The glass transition temperature was 8° C. (determined by DSC) and the minimum film forming temperature was 1° C.

Example 12 (According to the Invention)

Preparation of an Aqueous 2-Stage Acrylic Dispersion (Inverted Core-Shell) with Disulfide Crosslinker in the 2nd Stage A polymerization vessel equipped with metering apparatus, stirrer, and temperature regulation was charged at 20 to 25° C. under a nitrogen atmosphere with the initial charge (see below) which was then heated to 85° C. under stirring (150 rpm). When the temperature was reached, 17.14 g of a 21% strength by weight aqueous solution of sodium persulfate was added and the batch was stirred for 5 minutes. Then, with the temperature maintained, feed Z1 was metered continuously over the course of 40 min at a constant flow rate. After feed Z1 was finished, feed Z2 was added and the polymerization mixture was reacted at 85° C. for further 10 minutes. Thereafter, feed Z3 was added to the polymerization mixture over the course of 10 minutes at a constant flow rate. Subsequently, with the temperature maintained, feed Z4 was metered continuously into the polymerization mixture over the course of 90 minutes with a constant flow rate. After feed Z4 was finished, feed Z5 was added and the polymerization mixture was reacted at 85° C. for further 100 minutes. The aqueous polymer dispersion was cooled to room temperature and filtered through a 125 μm filter.

Initial Charge:

| | |
|---|---|
| 493.46 g | deionized water |
| 5.40 g | 25% strength by weight aqueous solution of sodium hydroxide |

Feed Z1 (Homogeneous Mixture of):

| | |
|---|---|
| 17.10 g | hydroxyethyl methacrylate (HEMA) |
| 85.50 g | methyl methacrylate |
| 32.40 g | n-butyl acrylate |
| 2.16 g | 2-ethylhexyl thioglycolate (EHTG) |

Feed Z2:

| | |
|---|---|
| 12.00 g | deionized water |

Feed Z3:

| | |
|---|---|
| 22.20 g | 0.75% strength by weight aqueous solution of sodium hydroxide |

Feed Z4:

| | |
|---|---|
| 4.50 g | disulfide diethanol dimethacrylate (DSDMA) |
| 92.70 g | methyl methacrylate |
| 217.80 g | n-butyl acrylate |

Feed Z5:

| | |
|---|---|
| 12.00 g | deionized water |

Thereby a polymer dispersion having a solids content of 45.1% by weight, a pH of 6.2, an average particle size of 177 nm (determined by means of HPPS) and a weight-average particle diameter of 173 nm (determined by means of HDC) was obtained. The glass transition temperatures were 8° C. and 57° C. (determined by DSC) and the minimum film forming temperature was <0° C.

Table 1 summarizes the Examples 1 to 12.

TABLE 1

Overview

| Example | Crosslinker | other components | Initiator | Temp.[1] |
|---|---|---|---|---|
| 1 * | none | SS, MAA, MMA, BA, | tBHP/NaABS | 60° C. |
| 2 * | HDDA | SS, MAA, MMA, BA | tBHP/NaABS | 60° C. |
| 3 | DSDMA | SS, MAA, MMA, BA | tBHP/NaABS | 60° C. |
| 4 * | DAAM/ADDH | SS, MAA, MMA, BA | tBHP/NaABS | 60° C. |
| 5 * | HDDA | SS, MAA, MMA, BA | tBHP/NaABS | 60° C. |
| 6 | DSDMA | SS, MAA, MMA, BA | tBHP/NaABS | 60° C. |
| 7 * | DAAM/ADDH | SS, MAA, MMA, BA | tBHP/NaABS | 60° C. |
| 8 * | DAAM/ADDH | SS, MAA, MMA, BA | NaPS | 85° C. |
| 9 | DSDMA | SS, MAA, MMA, BA | NaPS | 85° C. |
| 10 | DSDMA | SS, MAA, MMA, BA | tBHP/NaABS | 60° C. |
| 11 | DSDMA | SS, MAA, MMA, BA | tBHP/NaABS | 60° C. |
| 12 | DSDMA[2] | HEMA,MMA, BA, EHTG | NaPS | 85° C. |

* comparative example
[1] Polymerization Temperature
[2] added in a second step

Analytical Methods

Determination of Particle Diameter (HPPS, HDC)

The average particle diameter was determined by means of photon correlation spectroscopy (PCS), also known as quasielastic light scattering (QELS) or dynamic light scattering. The measurement method is described in the 15013321 standard. The determination was carried out using an HPPS (High Performance Particle Sizer). For this purpose, a highly diluted aqueous polymer dispersion (c~0.005%) was analyzed. Measurement configuration: HPPS from Malvern, automated, with continuous-flow cuvette and Gilson autosampler. Parameters: measurement temperature 22.0° C.; measurement time 120 seconds (6 cycles each of 20 s); scattering angle 173°; wavelength laser 633 nm (HeNe); refractive index of medium 1.332 (aqueous); viscosity 0.9546 mPas. The measurement gave an average value of the cumulant analysis (mean of fits). The mean of fits is an average, intensity-weighted particle diameter in nm, which corresponds to the volume-average or mass-average particle diameter.

The weight-average particle diameter was determined by HDC (Hydrodynamic Chromatography fractionation), as for example described by H. Wiese, "Characterization of Aqueous Polymer Dispersions" in Polymer Dispersions and Their Industrial Applications (Wiley-VCH, 2002), pp. 41-73. Measurements were carried out using a PL-PSDA particle size distribution analyzer (Polymer Laboratories, Inc.). A small amount of sample was injected into an aqueous eluent containing an emulsifier, resulting in a concentration of approx. 0.5 g/l. The mixture is pumped through a glass capillary tube of approx. 15 mm diameter packed with polystyrene spheres. As determined by their hydrodynamic diameter, smaller particles can sterically access regions of slower flow in capillaries, such that on average the smaller particles experience slower elution flow. The fractionation was finally monitored using an UV-detector which measured the extinction at a fixed wavelength of 254 nm.

Determination of the Minimum Film Forming Temperature (MFFT)

The MFFT is determined according to ISO 2115 by spreading the dispersion at a defined layer thickness (for example at 200 μm wet) on a cooled/heated plate along which a temperature gradient is established (for example from 0 to 40° C.). After complete drying in a controlled atmospheric environment, the film is visually examined for cracks. The MFFT is defined as the lowest temperature at which a homogeneous and crack-free film is formed.

Determination of the Glass Transition Temperature (Tg)

The glass transition temperature Tg is determined by Differential Scanning calorimetry (DSC) according to ISO 11357-1. This method involves monitoring the difference between the heat absorbed per unit time by the polymer film and the heat absorbed by a thermally inert reference material during a linear temperature ramp. The sample of interest and the reference are placed on sensor plates of defined thermal resistance R, and the temperature difference DT between both of them is then monitored over the temperature ramp. The heat flow difference (which is the negative quotient of DT and R) is then plotted as a function of temperature. Above Tg, the glassy polymer film becomes viscous or rubber like, which is caused by the polymer chains becoming mobile. This glass transition of a polymer usually occurs around a wide temperature range and becomes visible as the rate of the heat flow difference increases over that temperature range. The Tg is finally determined by the mid-point of the area of increased heat flow difference.

Stress-Strain Analysis

All samples were analyzed using a Zwick 1465 apparatus according to the ISO 527-3 norm. Films were produced and dried at room temperature for 7 days prior to testing. Films strips with a size of 10×60 mm were cut and analyzed at 23° C. and 50% relative humidity using a 20 N force sensor at a testing speed of 200 mm/min.

Confocal RAMAN Microscopy

The dispersions were applied dropwise onto a glass plate and dried at room temperature. The glass plate with the film was placed in the RAMAN microscope (100×NA 0.9 object lens; λ=532 nm) and the lased was focused accordingly before recording the spectra.

Dynamical Mechanical Analysis (DMTA)

In a dynamic mechanical thermal analysis (DMTA) experiment, a sinusoidal strain is applied to a sample either in elongation or in shear. During the experiment, the amplitude of the strain and the frequency are kept constant while a temperature gradient is applied. The strain amplitude is chosen to be in the linear viscoelastic regime of the sample.

As a result, the storage and loss modulus are obtained as a function of the temperature. Typical experimental conditions are a strain amplitude of 0.1%, a frequency of 1 Hz, and a temperature range from −20° C. to 160° C. with rate of 2° C./min. All measurements have been done with a Rheometrics Solids Analyzer RSA II.

Film Preparation

The polymer dispersions were poured into silicone molds and dried at 23° C. and 50% relative humidity. The amount put in the mold depends on the solids content of the dispersion and is chosen to give a final thickness of the dried film in the range of 0.5 mm to 1.5 mm. Typical dimensions of the films for the measurements were: length 20 mm, width 10 mm with a thickness of 0.7 mm to 0.9 mm.

The films were analyzed after drying for 7 days at 23° C. and 50% relative humidity.

Results of Characterization

Table 2 summarizes the analytical data of Examples 1 to 12.

TABLE 2

Analytical data

| Example | crosslink density [mmol/g polymer] | solids content [% by weigth] | pH | average particle size (1) [nm] | weight average particle diameter (2) [nm] | glass transition temperature (3) [° C.] | minimum film forming temperature [° C.] |
|---|---|---|---|---|---|---|---|
| 1 * | 0 | 39.7 | 8.2 | 137 | 137 | −4 | <0 |
| 2 * | 0.17 | 39.7 | 8.1 | 139 | 144 | −1 | <0 |
| 3 | 0.17 | 39.6 | 8.2 | 140 | 137 | 2 | <0 |
| 4 * | 0.17 | 39.0 | 8.3 | 136 | 137 | 4 | <0 |
| 5 * | 0.52 | 40.0 | 8.3 | 148 | 145 | 4 | <0 |
| 6 | 0.52 | 40.1 | 8.2 | 145 | 139 | 11 | 3 |
| 7 * | 0.52 | 40.6 | 8.0 | 137 | 142 | 21 | <0 |
| 8 * | 0.17 | 39.5 | 8.0 | 95 | 86 | 41 | 22 |
| 9 | 0.17 | 38.4 | 7.9 | 94 | 86 | 38 | 29 |
| 10 | 0.34 | 39.8 | 8.2 | 142 | 140 | 8 | 0 |
| 11 | 0.34 | 39.5 | 7.5 | 142 | 140 | 8 | 1 |
| 12 | | 45.1 | 6.2 | 177 | 173 | −8 and 57 | <0 |

* comparative example
(1) determined by means of HPPS
(2) determined by means of HDC
(3) determined by means of DSC Confocal RAMAN Microscopy The presence of disulfide functionalities in the dispersion films was proven by confocal RAMAN microscopy. FIG. 1 shows the RAMAN spectra of a sample without crosslinker (Example 1) in comparison to the samples with varying amount of DSDMA (0.17, 0.34 and 0.51 mmol/g polymer; Examples 3, 10 and 6). To evaluate the presence and amount of disulfide, the signals with a maximum at 510 cm$^{-1}$ (S—S bond) and 643 cm$^{-1}$ (C—S bond), respectively, were analyzed. With growing amount of DSDMA, a qualitative increase of the intensity of both signals is visible. A quantification was performed by comparing the signals to the C=O signal (at 1730 cm$^{-1}$) of the (meth)acrylic esters. The signal intensity of both the S—S and the C—S signal is proportional to the amount of DSMDA crosslinker. Table 3 summarizes the results.

TABLE 3

Comparison of signal intensities in dependence of DSDMA crosslinker concentration

| Example | crosslink density [mmol/g polymer] | area S-S (510 cm$^{-1}$) vs. C = O (1730 cm$^{-1}$) | area C-S (643 cm$^{-1}$) vs. C = O (1730 cm$^{-1}$) |
|---|---|---|---|
| 1 * | 0 | 0.10 | 0.04 |
| 3 | 0.17 | 0.15 | 0.08 |
| 10 | 0.34 | 0.20 | 0.11 |
| 6 | 0.51 | 0.25 | 0.15 |

* comparative example

Stress-Strain Analysis

All tested compositions and the corresponding values for maximum strain, tensile strength and toughness are summarized in Table 4. A graphical depiction of the results is given in FIG. 2.

Free-standing polymer films containing HDDA, DSDMA and DAAM/ADDH as copolymers (crosslinking density of 0.17 mmol/g polymer) were compared to a film without crosslinker (Examples 1 to 4).

The film containing DSDMA (Example 3) shows a better mechanical performance (higher maximum stain, tensile strength and toughness) than the film containing HDDA (Example 2). In addition, it shows a more balanced profile than the film containing DAAM/ADDH (Example 4) which has a higher tensile strength but lower maximum strain and toughness.

We can conclude that, in comparison to the use of HDDA, the copolymerization of DSDMA leads to a re-arrangement of the crosslinking network which results in inter-particular crosslinking.

TABLE 4

Results of stress-strain analysis

| Example | crosslinker | max strain [%] | tensile strength [MPa] | toughness [J/cm$^3$] |
|---|---|---|---|---|
| 1 * | none | 1601 | 1.4 | |
| 2 * | HDDA | 393 | 3.3 | 3.2 |
| 3 | DSDMA | 444 | 5.4 | 5.3 |
| 4 * | DAAM/ADDH | 178 | 8.5 | 3.9 |
| 10 * | HDDA | 270 | 1.8 | 1.6 |
| 11 | DSDMA | 89 | 3.4 | 1.0 |

* comparative example

Results of DMTA Analysis

Free-standing polymer films containing the crosslinkers HDDA, DSDMA and DAAM/ADDH in co-polymer concentrations of 0.17, 0.34 and 0.51 mmol/g polymer were analyzed by DMTA. The results are depicted in FIGS. 3 and 4.

FIG. 3: A comparison of the measured storage modulus at cross-linker concentrations of 0.51 mmol/g polymer shows a higher plateau for the film containing DSDMA (Example 6) than for the film containing HDDA (Example 5). This suggests the proposed re-arrangement of the cross-linking network which results in inter-particular crosslinking, which is not possible in case of HDDA as crosslinker. Due to film rupture at approx. 95° C., the film containing DSDMA was not able to be investigated at higher temperature. The steady slope of the curve obtained from the film containing DAAM/ADDH (Example 12) probably results from the formation of a gradient-like particle morphology with the polar DAAM being localized mainly in the outer regions of the particle. A more homogeneous distribution can be assumed for the DSDMA.

FIG. 4: A comparison of the measured storage modulus at DSDMA concentrations of 0.17, 0.34 and 0.51 mmol/g polymer (Example 3, 10 and 6) shows an increase of the plateau with increasing DSDMA content. If the dispersion has been treated with an additional amount of NaABS at 80° C., as it was the case for Example 11, the plateau increases further (Example 11 vs. 10).

Chemical Resistance

In addition to mechanical properties, resistance against water, solvents and various other chemicals is a key property of coatings. Two products containing the crosslinking benchmark DAAM/ADDH (a market standard and Example 8) were compared to a sample containing an identical amount of DSDMA (Example 9) according to DIN 68861-1B. The results are summarized in the Table 5.

TABLE 5

Results of chemical resistance tests (rating: 0 = poor, 5 = excellent).

| Chemical resistance on beech vaneer | market standard | Example 8 | Example 9 |
|---|---|---|---|
| Water 24 h | 5 | 5 | 5 |
| Atrix handcream 24 h | 4 | 4 | 4 |
| Paraffinoil 24 h | 5 | 5 | 5 |
| Mustard 6 h | 3.5 | 3 | 3 |
| Red wine 6 h | 5 | 4 | 4.5 |
| Coffee 16 h | 5 | 5 | 5 |
| Acetic acid 10% 1 h | 5 | 5 | 5 |
| Ammonia 10% 2 min | 5 | 5 | 4.5 |

The resistance of the polymer film containing DSDMA (Example 9) is comparable to the film containing the same crosslinking density but with DAAM/ADDH (Example 8) and to the market standard.

Wood Grain Enhancement (Anfeuerung)

An important task of clear coatings for wood is to support the aesthetical appearance of the wood surface. Contributions to this are, in addition to gloss, the wood tone (light or dark, warm or cold) and the enhancement of the wood structure (contrast between light and dark regions). All these factors are summarized in the property of wood grain enhancement, or "Anfeuerung". There are many factors contributing to how a coating changes the appearance of a wood surface, and most of them are not yet understood.

Unexpectedly, it was found out that a DSDMA containing film (Example 9) gives a warmer wood tone than its counterpart with the benchmark system DAAM/ADDH (Example 8).

The invention claimed is:

1. An aqueous polymer dispersion, comprising a water insoluble polymer P in the form of dispersed polymer particles, which is obtained by free radical aqueous emulsion polymerization of ethylenically unsaturated monomers M, which comprise
   a) at least one monomer M1 which has two ethylenically unsaturated moieties which are connected by a linker which comprises a disulfide moiety, and
   b) at least one monoethylenically unsaturated monomer M2, which has a solubility in deionized water at 25° C. and 1 bar of not more than 60 g/l.

2. The polymer dispersion according to claim 1, wherein the monomer M1 is selected from monomers of formula (I)

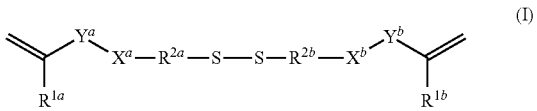

(I)

$X^a$ is O or NH,
$X^b$ is O or NH,
$Y^a$ is $CH_2$, C=O or a chemical bond,
$Y^b$ is $CH_2$, C=O or a chemical bond,
$R^{1a}$ is H or $C_1$-$C_3$-alkyl,
$R^{1b}$ is H or $C_1$-$C_3$-alkyl,
$R^{2a}$ is $C_1$-$C_4$-alkylene,
$R^{2b}$ is $C_1$-$C_4$-alkylene.

3. The polymer dispersion according to claim 1, wherein the monomer M1 is selected from monomers of formula (Ia)

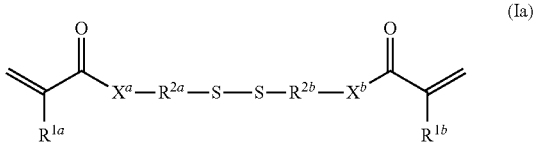

(Ia)

wherein
$X^a$ is O or NH,
$X^b$ is O or NH,
$R^{1a}$ is H or $C_1$-$C_3$-alkyl,
$R^{1b}$ is H or $C_1$-$C_3$-alkyl,
$R^{2a}$ is $C_1$-$C_4$-alkylene,
$R^{2b}$ is $C_1$-$C_4$-alkylene.

4. The polymer dispersion according to claim 1, wherein the at least one unsaturated monomer M2 is selected from the group consisting of
   esters of monoethylenically unsaturated $C_3$-$C_8$ monocarboxylic acids with $C_1$-$C_{30}$ alkanols and diesters of $C_4$-$C_8$ dicarboxylic acids with $C_1$-$C_{30}$ alkanols,
   esters of vinyl alcohol or allyl alcohol with $C_1$-$C_{30}$ monocarboxylic acids,
   vinylaromatics,
   amides of monoethylenically unsaturated $C_3$-$C_8$ monocarboxylic acids with $C_1$-$C_{30}$ alkylamines or di-$C_1$-$C_{30}$ alkylamines and diamides of $C_4$-$C_8$ dicarboxylic acids with $C_1$-$C_{30}$ alkylamines or di-$C_1$-$C_{30}$ alkylamines,
   and mixtures thereof.

5. The polymer dispersion according to claim 1, wherein the monomers M comprise at least of 80% by weight, based on the total amount of monomers M, of the monomers M1 and M2.

6. The polymer dispersion according to claim 1, wherein the monomers M comprise at least one monoethylenically unsaturated monomer M3 which has a solubility in deionized water at 25° C. and 1 bar of at least 100 g/l.

7. The polymer dispersion according to claim 6, wherein the monomer M3 is selected from the group consisting of
   monoethylenically unsaturated $C_3$-$C_8$ monocarboxylic acids and primary amides of monoethylenically unsaturated $C_3$-$C_8$ monocarboxylic acids,
   hydroxy-$C_2$-$C_4$-alkyl esters of monoethylenically unsaturated $C_3$-$C_8$ monocarboxylic acids,
   monoesters of monoethylenically unsaturated $C_3$-$C_8$ carboxylic acids with polyoxy-$C_2$-$C_4$ alkylene ethers,
   monoethylenically unsaturated monomers having at least one urea group, and mixtures thereof.

8. The polymer dispersion according to claim 1, wherein the monomers M comprise
   0.1 to 30% by weight, based on the total amount of monomers M, of at least one monomer M1, and
   70 to 99.9% by weight, based on the total amount of monomers M, of at least one monomer M2,
   0 to 20% by weight, based on the total amount of monomers M, of one or more monomers M3.

9. The polymer dispersion according to claim 1, wherein the polymer P has thiol groups.

10. The polymer dispersion according to claim 1, wherein the volume average particle diameter of the polymer particles, determined by dynamic light scattering according to ISO13321:2004 standard, is in the range from 20 to 600 nm.

11. A process for preparing an aqueous polymer dispersion according to claim 1, comprising free radical emulsion polymerizing ethylenically unsaturated monomers M in the presence of a free radical polymerization initiator.

12. The process according to claim 11, wherein the initiator is selected from
   initiators comprising an oxidizing agent and a reducing agent and
   initiators consisting of at least one persulfate compound.

13. The process according to claim 11, where in the polymer P a portion of the disulfide moieties of Monomer M1 are partially reduced to thiol moieties.

14. The process according to claim 11, where at least 90% by weight of the monomers M to be polymerized are added to the polymerization reaction in the course of the polymerization under polymerization conditions.

15. A solid polymer composition in powder form, which is obtained by drying the aqueous polymer dispersion according to claim 1.

16. The solid polymer composition in powder form according to claim 15, which is obtained by a spray drying process.

17. The solid polymer composition in powder form according to claim 15, where the aqueous polymer dispersion, from which the solid composition is obtained, comprises particles that have a volume average particle diameter of the polymer particles, as determined by dynamic light scattering (DLS), is in the range from 20 to 600 nm.

18. A process for preparing a solid polymer composition in powder form, comprising spray drying of the aqueous polymer dispersion according to claim 1.

19. A coating material, adhesive, or sealant comprising the polymer dispersion according to claim 1.

20. A binder in a coating or a coating composition comprising the polymer dispersion according to claim 1.

21. A method for producing a polymer-consolidated nonwoven fabric comprising utilizing the polymer dispersion according to claim 1.

22. A method for modifying an inorganic, hydraulically setting binder comprising utilizing the polymer dispersion according to claim 1.

23. A method of coating a surface of a substrate which comprises applying an aqueops coating composition, which comprises the aqueous polymer dispersion of claim 1 as a binder, and allowing the thus obtained wet coating to dry in the presence of oxygen.

* * * * *